US008801940B2

(12) United States Patent
Triglavcanin et al.

(10) Patent No.: US 8,801,940 B2
(45) Date of Patent: Aug. 12, 2014

(54) FEEDWELLS

(71) Applicant: Outotec Oyj, Espoo (FI)

(72) Inventors: Richard Triglavcanin, Dalkeith (AU);
Jian Dong Wang, Cromer Heights (AU);
Michael Andrew Brown, Beacon Hill (AU)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/858,285

(22) Filed: Apr. 8, 2013

(65) Prior Publication Data

US 2013/0228533 A1 Sep. 5, 2013

Related U.S. Application Data

(63) Continuation of application No. 12/992,869, filed as application No. PCT/AU2009/000537 on Apr. 30, 2009, now Pat. No. 8,540,887.

(30) Foreign Application Priority Data

May 15, 2008 (AU) ............................... 2008902416

(51) Int. Cl.
*B01D 21/24* (2006.01)
(52) U.S. Cl.
CPC ........ *B01D 21/2411* (2013.01); *B01D 21/2427* (2013.01)
USPC .......................... 210/801; 210/519; 210/532.1
(58) Field of Classification Search
USPC ............... 210/800, 801, 519, 528, 532.1, 541
See application file for complete search history.

(56) References Cited

U.S. PATENT DOCUMENTS

| 2,894,637 | A  | 7/1959  | Schreiber       |
|-----------|----|---------|-----------------|
| 3,006,474 | A  | 10/1961 | Bryant          |
| 3,170,770 | A  | 2/1965  | Bousman et al.  |
| 3,532,218 | A  | 10/1970 | Blottnitz et al.|
| 4,270,676 | A  | 6/1981  | Green           |
| 5,147,556 | A  | 9/1992  | Taylor          |
| 5,893,970 | A  | 4/1999  | Wood et al.     |
| 6,334,952 | B1 | 1/2002  | Hayakawa et al. |
| 6,800,209 | B2 | 10/2004 | Wright          |
| 6,811,699 | B2 | 11/2004 | Arnaud          |
| 6,953,123 | B2 | 10/2005 | Niitti          |
| 6,966,985 | B2 | 11/2005 | Schoenbrunn et al. |

(Continued)

FOREIGN PATENT DOCUMENTS

| DE | 3818624 C2 | 9/1991 |
| SU | 1320176 A1 | 6/1987 |

(Continued)

*Primary Examiner* — Christopher Upton
(74) *Attorney, Agent, or Firm* — Fish & Richardson P.C.

(57) ABSTRACT

The invention provides several improvements in feedwells, one of which being a feedwell comprising a mixing zone for dissipating the kinetic energy of a fluid comprising pulp, a settling zone for promoting flocculation of the pulp and at least one inclined deflecting element for at least partially separating the mixing zone from the settling zone. Other improvements include a shelf at least partially defining an inclined path for removing material from the shelf into a feedwell chamber; at least two outlets arranged in a substantially concentric relationship with respect to each other; a portion of a second conduit varies in its cross-sectional size and/or shape so as to connect a feed inlet to a first conduit; and a partition for partially separating an outer mixing zone and an inner settling zone.

37 Claims, 24 Drawing Sheets

(56) References Cited

U.S. PATENT DOCUMENTS

| | | |
|---|---|---|
| 7,235,182 B2 * | 6/2007 | Taylor et al. .................. 210/800 |
| 7,238,281 B2 | 7/2007 | Su et al. |
| 2005/0115907 A1 | 6/2005 | Taylor |
| 2005/0155917 A1 | 7/2005 | Taylor et al. |
| 2005/0252868 A1 | 11/2005 | Albertson |
| 2007/0209996 A1 | 9/2007 | Zhou |

FOREIGN PATENT DOCUMENTS

| | | |
|---|---|---|
| SU | 1503848 A1 | 8/1989 |
| WO | WO0012192 A1 | 3/2000 |
| WO | WO2007061599 A1 | 5/2007 |
| WO | WO2008053065 A1 | 5/2008 |
| WO | WO2008053066 A1 | 5/2008 |
| WO | WO2008141362 A1 | 11/2008 |

* cited by examiner

FEEDWELLS

FIELD OF THE INVENTION

The present invention relates to separation devices for liquid suspensions and pulps and in particular to a feedwell for use in such devices, It has been developed primarily for use in thickeners and will be described hereinafter with reference to this application. However, it will be appreciated that the invention is not limited to this particular field of use.

BACKGROUND OF THE INVENTION

The following discussion of the prior art is intended to present the invention in an appropriate technical context and allow its significance to be properly appreciated. Unless clearly indicated to the contrary, however, reference to any prior art in this specification should not be construed as an admission that such art is widely known or forms part of common general knowledge in the field.

Separation devices, such as thickeners, clarifiers and concentrators, are typically used for separating solids from suspensions (typically containing solids suspended in a liquid) and are often found in the mining, mineral processing, food processing, sugar refining, water treatment, sewage treatment, and other such industries. These devices typically comprise a tank in which solids are deposited from a suspension or solution and settle toward the bottom as pulp or sludge to be drawn of from below and recovered. A dilute liquor of lower relative density is thereby displaced toward the top of the tank, for removal via an overflow launder. The suspension to be thickened is initially fed through a feed pipe, conduit or line into a feedwell disposed within the main tank. A rake assembly is conventionally mounted for rotation about a central drive shaft and typically has at least two rake arms having scraper blades to move the settled material inwardly for collection through an underflow outlet.

In its application to mineral processing, separation and extraction, a finely ground ore is suspended as pulp in a suitable liquid medium such as water at a consistency which permits flow, and settlement in quiescent conditions. The pulp is settled from the suspension by a combination of gravity with or without chemical and/or mechanical processes. Initially, reagents, such as coagulant and/or flocculant, can be added into the suspension to improve the settling process. The suspension is then carefully mixed into the separation device, such as a thickener, to facilitate the clumping together of solid particles, eventually forming larger denser "aggregates" of pulp particles that are settled out of suspension.

Known separation devices of this type typically include a thickening tank and a feedwell disposed generally within the tank to contain feed slurry. The feedwell is typically comprised of a single chamber having an inlet for receiving feed slurry, and an outlet for the slurry to descend into the thickening tank. The feedwell is configured to reduce the turbulence of the incoming feed stream, to allow reagents to be mixed into the slurry, and to allow for reaction between reagents and the feed material before the treated slurry is discharged into the thickening tank. Diluted liquid in the thickening tank may also be added to the feed liquid in the feedwell to increase the efficiency of the coagulation and/or flocculation process. The configuration of the feedwell may also promote even distribution of slurry flowing from its outlet into the thickening tank. Where the separation device includes a rake assembly to facilitate the flocculation and separation processes, the rake is typically rotatably mounted on a central drive shaft within the thickening tank and a lifting mechanism is used to vertically adjust the rake assembly to vary its depth in the thickening tank.

One type of feedwell employs one or more planar plates or "shelves" to extend the retention time of the feed slurry in the feedwell, thereby enhancing mixing of the reagents into the slurry and thus the reaction between the reagents and the feed material. Increasing the shelf width renders the shelf effective in enhancing mixing and flocculation. However, a disadvantage of these shelves is that flocculated solids tend to accumulate on the shelf in the form of a sticky "mud", thus rendering the shelf ineffective or less effective for its intended purpose. This requires the feedwell to be frequently cleaned, which necessitates shutting down the thickener and thus results in loss of production. This problem is exacerbated with shelves of increased width, as this tends to increase the amount of solids that build up on the shelf as well as the probability of this occurring.

Although the presence of one or more shelves assists retention of the feed slurry in the feedwell, there is no control of the flow of the slurry in the feedwell chamber. As a consequence, a substantial portion of the slurry may flow off the shelf or shelves and downwardly out of the feedwell chamber without mixing sufficiently with reagents and/or dilution liquid. Also, the slurry may exit the feedwell at too high a velocity, hindering clumping together of solid particles, and hence hindering or preventing the formation of the desired pulp aggregates.

Another type of feedwell has a deflection cone at the base of the feedwell chamber to define a restricted outlet for the feedwell. The restricted outlet assists with maintaining residence time in the feedwell chamber and enables the treated slurry to exit the feedwell at the desired velocity to encourage the formation of pulp aggregates in the settling process, while the deflection cone provides more even distribution of the treated slurry into the thickening tank. As a feedwell of this type increases in size, the deflection cone must also increase in size to maintain the size of the restricted outlet and hence the required exit velocity and even distribution of the treated slurry. However, at larger sizes, the deflection cone extends further downwardly into the thickening tank, and thus can interfere with the operation of the rake assembly, especially the lifting mechanism for vertically adjusting the height of the rake assembly along its drive shaft.

Increasing the size of the separation device also generally increases the size of the feed slurry flows. Thus, the feed pipe and the associated feed inlet of the feedwell must also increase in size to accommodate the increased volumetric flow rate of the incoming feed slurry. As the feedwell increases in size, the feed inlet tends to occupy a proportionately greater area of the sidewall, and in some cases can effectively require the entire height of the feedwell chamber sidewall. This results in the incoming slurry tending to flow into and out of the feedwell without the necessary residence time in the feedwell chamber, inhibiting optimal mixing of the slurry with reagents and failing to allow the turbulence in the slurry to quiesce, which is required in order to promote optimal settling in the thickening tank. As a consequence, the volumetric capacity of the feedwell is limited by the diameter of the feed inlet, which in turn is limited due to the need to confine the feed inlet generally in an upper portion of the feedwell.

A further type of feedwell has two separate chambers, typically arranged as an upstream chamber and a downstream chamber. It has been found that agglomerated particles tend to accumulate or build-up at the base of the upstream chamber, commonly called "sanding". As mixing of the feed slurry with reagents and/or dilution liquid tends to occur in the upstream chamber, this sanding phenomenon hinders efficient mixing and reduces the overall residence time of the slurry in the feedwell, and hence settling in the tank.

It is an object of the invention to overcome or ameliorate one or more of the deficiencies of the prior art, or at least to provide a useful alternative.

SUMMARY OF THE INVENTION

According to a first aspect of the invention, there is provided a feedwell for a separation device, the separation device having a thickening tank, the feedwell comprising:

a sidewall at least partially defining a feedwell chamber;

a feed inlet for directing feed liquid into the feedwell chamber;

an outlet disposed below the feed inlet to direct feed liquid in the chamber into the thickening tank, and a shelf at least partially defining an inclined path for removing material from the shelf into the feedwell chamber and inhibiting the build up of material thereon.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

In one embodiment, the shelf is preferably disposed substantially within the chamber generally between the feed inlet and the outlet to disperse kinetic energy in the feed liquid and increase residence time of the feed liquid within the chamber. In another embodiment, the shelf at least partially defines the feedwell chamber.

Preferably, the inclined path is formed adjacent the sidewall. Preferably, the inclined path is downwardly inclined to release material from the shelf Preferably, the inclined path is radially inwardly inclined. Preferably, the inclined path is inclined in the longitudinal direction of the shelf, Preferably, the inclined path is circumferentially inclined with respect to the sidewall. In one preferred form, the inclined path is substantially helical in shape, Preferably, the shelf comprises an inclined surface defining the inclined path. Preferably, the shelf defines the inclined path. In one preferred form, the shelf extends from or adjacent to the sidewall at an angle of inclination, Preferably, the feedwell comprises a plurality of the shelves. Preferably, the shelves define an additional inclined path. Preferably, the additional inclined path extends around the circumference of the sidewall. In one preferred form, the additional inclined path is substantially helical in shape.

Preferably, the shelf is fixedly secured to the sidewall along one longitudinal edge. Alternatively, the shelf is moveable relative to the sidewall to adjust the angle of inclination.

Preferably, the shelf at least partially extends longitudinally along the sidewall. In one preferred form, the shelf is at least partially annular in shape, In another embodiment, the shelf is helical in shape.

Preferably, the sidewall is substantially cylindrical in shape and the shelf extends at least partly around the circumference of the sidewall. Preferably, the shelf extends around at least between ¼ and ¾ of the circumference of the sidewall. In one particularly preferred form, the shelf extends substantially around the circumference of the sidewall.

Where the inclined path is radially inwardly inclined, it is preferred that the angle of inclination is substantially between 10° and 15° relative to the horizontal plane, Where the inclined path is circumferentially inclined, it is preferred that the angle of inclination is substantially between 2° and 10°, more preferably between 2° and 6°, relative to the horizontal plane.

Preferably, the feed inlet directs a unidirectional flow of the feed liquid into the feedwell. More preferably, the feed inlet directs the feed liquid substantially tangentially with respect to the sidewall.

Preferably, the feed inlet is disposed such that the feed liquid flows from the feed inlet onto the shelf. More preferably, the feed inlet deposits feed liquid on the shelf. In one preferred form, the feed inlet is positioned adjacent the shelf, such that feed liquid enters the feedwell chamber over and/or onto the shelf. In another preferred form, the feed inlet is located at or towards the top of the shelf.

In one particularly preferred form, the feedwell comprises a mixing zone for dissipating kinetic energy of a liquid suspension or pulp therein and a settling zone for promoting flocculation. Preferably the shelf is located between the mixing zone and the settling zone. In one preferred form, the shelf at least partially defines the boundary between the mixing zone and the settling zone.

Preferably, the mixing zone is at least partially defined by at least one deflecting element. Preferably, the at least one deflecting element comprises one or more openings for fluid flow from the mixing zone into the settling zone.

Preferably, the at least one deflecting element extends substantially horizontally. More preferably, the at least one deflecting element comprises one or more vanes extending horizontally and radially within the feedwell. In one preferred form, the vanes are inclined relative to a horizontal plane of the feedwell. Alternatively, the at least one deflecting element comprises a substantially horizontal plate, According to a second aspect of the invention, there is provided a feedwell for a separation device, the feedwell comprising a mixing zone for dissipating the kinetic energy of a fluid comprising pulp, a settling zone for promoting flocculation of the pulp and at least one inclined deflecting element for at least partially separating the mixing zone from the settling zone.

By providing an inclined deflecting element, the feedwell is advantageously able to encourage the dissipation of kinetic energy of the incoming feed liquid and mixing with reagents, such as flocculating and/or coagulating agents, in the mixing zone and thus improve the settling efficiency of the separation device.

Preferably, the at least one inclined deflecting element restricts fluid flow from the mixing zone into the settling zone. More preferably, the at least one inclined deflecting element temporarily retains the fluid within the mixing zone before permitting the fluid to flow into the settling zone.

Preferably, the at least one inclined deflecting element has an inner end and an outer end with respect to the feedwell, wherein one of the inner and outer ends is raised relative to the other of the inner and outer ends. In one preferred form, the inner end is raised relative to the outer end.

Preferably, the at least one inclined deflecting element extends radially from a central axis of the feedwell. More preferably, the central axis is substantially vertical.

Preferably, the at least one inclined deflecting element is inclined with respect to a horizontal plane of the feedwell. Preferably, the at least one inclined deflecting element is inclined with respect to a vertical plane of the feedwell. In one preferred form, the vertical plane is coincident with the central axis. In another preferred form, the at least one deflecting element is inclined radially inward with respect to the feedwell. In a particularly preferred form, the at least one inclined deflecting element is inclined with respect to both the horizontal and vertical planes.

Preferably, the at least one inclined deflecting element comprises two or more portions, of which at least one portion is inclined. More preferably, the at least one inclined deflecting element portion has an inner end and an outer end with respect to the feedwell, wherein one of the inner and outer ends is raised relative to the other of the inner and outer ends. In one preferred form, the inner end is raised relative to the outer end. In another preferred form, the at least one inclined deflecting element portion is inclined radially inward relative to the feedwell chamber.

Preferably, the at least one inclined deflecting element is connected at one end to a shelf of the feedwell. More preferably, an outer end of the at least one inclined deflecting element is connected to a shelf of the feedwell.

Preferably, at least two deflecting element portions are connected by their respective ends to form the at least one deflecting element. More preferably, at least two deflecting element portions each have an inner end and an outer end with respect to the feedwell, wherein one of the inner and outer ends is raised relative to the other of the inner and outer ends. In one preferred form, the at least two deflecting element portions are connected at their respective inner and outer ends. In another preferred form, the at least two deflecting element portions alternate between an upward and downward inclination with respect to the horizontal or vertical plane.

Preferably, the outer end of the deflecting element portion is connected to a shelf of the feedwell.

Preferably, the at least one deflecting element comprises a plurality of deflecting elements. Preferably, the deflecting elements are spaced apart to define one or more openings to permit fluid flow from the mixing zone into the settling zone. In one preferred form, the at least one inclined deflecting element comprises one or more baffles. In a particularly preferred form, the at least one inclined deflecting element comprises one or more planar vanes, Preferably, the at least one inclined deflecting element comprises one or more openings to permit fluid flow from the mixing zone into the settling zone. More preferably, the at least one inclined deflecting element comprises a frusto-conical section having one or more openings in its surface.

Preferably, the separation device has a thickening tank, the feedwell further comprising a sidewall at least partially defining a feedwell chamber at least partially containing the mixing zone and the settling zone, a feed inlet for directing feed liquid into the feedwell chamber, an outlet disposed below the feed inlet to direct feed liquid in the chamber into the thickening tank, and a shelf at least partially defining an inclined path for removing material from the shelf into the feedwell chamber and inhibiting the build up of material thereon.

Preferably, the feedwell further comprises an inlet for receiving a fluid comprising pulp, and at least two outlets for discharging fluid into the separation device, wherein the at least two outlets are arranged in a substantially concentric relationship with respect to each other.

Preferably, the feedwell further comprises a feed inlet for receiving a fluid comprising pulp from a first conduit, and a second conduit for connecting the first conduit and the feed inlet in fluid communication, wherein the first conduit has a first cross-sectional size and/or shape, the feed inlet has a second cross-sectional size and/or shape different to the first cross-sectional size and/or shape, and a portion of the second conduit varies in its cross-sectional size and/or shape so as to connect the feed inlet to the first conduit.

According to a third aspect of the invention, there is provided a feedwell for a separation device, the feedwell comprising an inlet for receiving a fluid comprising pulp, and at least two outlets for discharging fluid into the separation device, wherein the at least two outlets are arranged in a substantially concentric relationship with respect to each other.

By providing at least two discharge outlets in a substantially concentric relationship to one another, the effective depth of the feedwell is minimised, permitting the feedwell to be increased in size whilst maintaining the required width of the outlets without interfering with the operation of the rake assembly.

Preferably, the outlets are adjacent each other. More preferably, the outlets are substantially annular.

Preferably, the feedwell comprises at least one deflection surface that at least partially defines at least one of the outlets. More preferably, the at least one deflection surface at least partially defines two or more passages or conduits for guiding fluid flow toward to the outlets.

Where there are at least two deflection surfaces, it is preferable that the deflection. surfaces are disposed substantially coaxially or concentrically with respect to each other. It is also preferable that the deflection surfaces complement each other in shape to minimise their respective heights or depths relative to the separation device. More preferably, the deflection surfaces are disposed in a nested relationship with respect to each other.

Preferably, the deflection surfaces are substantially conical or frusto-conical in shape. In one preferred form, the deflection surfaces are frusto-conical in shape. In another preferred form, an inner deflection surface is conical in shape and an outer deflection surface is frusto-conical in shape.

Preferably, at least two deflection surfaces comprise an inner deflection surface and an outer deflection surface, to respectively define inner and outer conduits and inner and outer outlets.

According to a fourth aspect of the invention, there is provided a feedwell for a separation device, the feedwell comprising a feed inlet for receiving a fluid comprising pulp from a first conduit, and a second conduit for connecting the first conduit and the feed inlet in fluid communication, wherein the first conduit has a first cross-sectional size and/or shape, the feed inlet has a second cross-sectional size and/or shape different to the first cross-sectional size and/or shape, and a portion of the second conduit varies in its cross-sectional size and/or shape so as to connect the feed inlet to the first conduit.

By providing the second conduit with a transition portion varying in cross-section, the first conduit and the feed inlet can be in fluid communication with each other, despite having different cross-sectional profiles. This enables the feed inlet to feed fluid into the upper portion of the feedwell, irrespective of the size and/or shape of the first conduit, which is essentially the main feed inlet pipe. More specifically, this enables the effective height of the feed inlet to be minimised without necessarily limiting the area of the feed inlet, thus removing the feed inlet size as a design limitation for large volumetric capacity separation devices. Another advantage provided by the second conduit and its varying transition portion is that it permits the position of the main feed inlet pipe to be raised relative to the feedwell, thus raising the lowermost point of entry of the feed fluid. This allows the feedwell to be designed to form the mixing and settling zones without being restricted by the size, shape and location of the main feed inlet pipe relative to the sidewall of the feedwell, since it enables substantially all of the feed fluid to be delivered into the mixing zone.

Preferably, the second conduit comprises an inlet fluidly connectable to the first conduit and an outlet fluidly connectable to the feed inlet, In one preferred form, the second conduit outlet has substantially the same cross-sectional size and/or shape as the second cross-sectional size and/or shape of the feed inlet.

Preferably, the portion of the second conduit forms at least a partially continuous transition from the first cross-sectional size and/or shape to the second cross-sectional size and/or shape. Alternatively, the second conduit varies in its cross-sectional size and/or shape along substantially its entire length to provide a continuous transition from the first cross-sectional size and/or shape to the second cross-sectional size and/or shape.

Preferably, the feed inlet has a height less than the height of the first conduit. More preferably, the feed inlet has a width greater than the width of the first conduit. In one embodiment, the feed inlet is generally rectangular in shape, having a width to height ratio of at least 1.2:1.

Preferably, the second conduit is configured such that the feed liquid is fed from the feed inlet substantially tangentially into the feedwell. In some embodiments, the feed liquid may not be fed in entirely tangentially, although in most embodiments, it is preferred that there is at least some tangential component of velocity of the feed stream upon entry into the feedwell through the inlet.

Preferably, the cross-sectional flow area of the feed inlet is substantially equal to the cross-sectional flow area of the first conduit. More preferably, the velocity of the fluid entering the feedwell from the feed inlet is substantially the same as the velocity of the fluid entering the second conduit from the first conduit.

Preferably, the feed inlet feeds fluid into an upper portion or section of the feedwell. The feed inlet preferably feeds fluid into the upper 75% of the feedwell, more preferably the upper 50% of the feedwell and even more preferably the upper 30% of the feedwell.

Preferably, the second conduit portion is configured such that the obvert of the first conduit is higher than the obvert of the feed inlet. That is, the ceiling of the first conduit is higher than the ceiling of the feed inlet. Alternatively, the second conduit portion is configured such that the invert of the first conduit is lower than the invert of the feed inlet. That is, the floor of the first conduit is lower than the floor of the feed inlet.

In one preferred form, the first conduit is a feed pipe upstream of the feedwell. Alternatively, the first conduit comprises a feed line, channel (open or closed) or trough upstream of the feedwell.

According to a fifth aspect of the invention, there is provided a feedwell for a separation device, said feedwell comprising an outer mixing zone for dissipating the kinetic energy of a feed pulp, an inner settling zone for promoting flocculation of the pulp and a partition for partially separating the outer mixing zone and the inner settling zone.

Preferably, the partition is configured to release feed pulp from the outer mixing zone into the settling zone, thereby inhibiting the build up of feed pulp in the outer mixing zone.

Preferably, the partition comprises one or more openings for releasing the feed pulp from the outer mixing zone into the inner settling zone. Preferably, one or more guiding elements for guiding the feed pulp from the outer mixing zone into the inner settling zone are associated with the one or more openings. More preferably, the one or more guiding elements are located adjacent or at the respective edges of the one or more openings. Preferably, the one or more guiding elements extend partially into the settling zone. In one preferred form, the one or more guiding elements comprise substantially planar plates.

Preferably, the one or more guiding elements are circumferentially arranged around the partition. More preferably, the one or more guiding elements are arranged substantially longitudinally with respect to the partition.

Preferably, the partition is substantially coaxial with the feedwell. In one preferred form, the partition is substantially vertical. In another preferred form, the partition is generally cylindrical. In a further preferred form, the partition is substantially frusto-conical in shape.

Preferably, the partition partially defines the outer mixing zone and the inner settling zone. In one preferred form, the outer mixing zone is substantially annular in shape.

Preferably, the outer mixing zone and the inner settling zone are arranged in a substantially concentric relationship with respect to each other. In one preferred form, the outer mixing zone and the inner settling zone are substantially adjacent to each other.

Preferably, the feedwell further comprises a lower settling area disposed below the inner settling zone. More preferably, the lower settling area is disposed below the inner settling zone and the outer mixing zone.

According to a sixth aspect, the invention provides a method for inhibiting the build up of material on a shelf in a feedwell, the feedwell comprising a sidewall at least partially defining a feedwell chamber, a feed inlet for directing feed liquid into the feedwell chamber and an outlet disposed below the feed inlet to direct feed liquid in the chamber into a thickening tank, the method comprising the step of defining an at least partially inclined path with the shelf for removal of material therefrom into the feedwell chamber.

In one embodiment, the method comprises disposing the shelf substantially within the chamber generally between the feed inlet and the outlet to disperse kinetic energy in the feed liquid and increase residence time of the feed liquid within the chamber. In another embodiment, the method comprises at least partially defining the feedwell chamber with the shelf.

Preferably, the path-defining step comprises defining the inclined path adjacent the sidewall. Preferably, the method comprises the step of forming a downwardly inclined path to release built up material from the shelf Preferably, the path-defining step comprises defining a radially inwardly inclined path. Preferably, the path-defining step comprises defining a path inclined in the longitudinal direction of the shelf. Preferably, the path-defining step comprises defining a circumferentially inclined path with respect to the sidewall. In one preferred form, the inclined path is substantially helical in shape.

Preferably, an inclined surface of the shelf defines the inclined path. Preferably, the shelf defines the inclined path. In one preferred form, the shelf extends from or adjacent to the sidewall at an angle of inclination to define the inclined path.

Preferably, the method comprises the step of providing a plurality of the shelves. Preferably, the shelves define an additional inclined path. Preferably, the additional . inclined path extends around the circumference of the sidewall. In one preferred form, the additional inclined path is substantially helical in shape.

Preferably, the method comprises the step of fixedly securing the shelf to the sidewall along one longitudinal edge. Alternatively, the method comprises the step of moveably securing the shelf to the sidewall to permit adjustment of the angle of inclination.

Preferably, the method comprises the step of extending the shelf longitudinally at least partially along the sidewall. In one preferred form, the shelf is at least partially annular in shape. Alternatively, the shelf is substantially helical in shape.

Preferably, the method comprises the step of extending the shelf at least partly around the circumference of the sidewall. Preferably, the shelf extends around at least between ¼ and ¾ of the circumference of the sidewall. In one particularly preferred form, the shelf extends substantially entirely around the circumference of the sidewall.

Where the inclined path is radially inwardly inclined, it is preferred that the angle of inclination is substantially between 10° and 15° relative to the horizontal plane. Where the inclined path is circumferentially inclined, it is preferred that the angle of inclination is substantially between 2° and 10°, more preferably between 2° and 6°, relative to the horizontal plane.

Preferably, the method comprises the step of feeding a feed liquid into the feedwell unidirectionally into the feedwell, More preferably, the feed liquid is fed into the feedwell substantially tangentially to the sidewall.

Preferably, the method comprises disposing the feed inlet such that the feed liquid flows from the feed inlet onto the shelf. More preferably, the feed inlet deposits feed liquid on the shelf. In one preferred form, the feed inlet is positioned adjacent the shelf, such that the feed liquid enters over or onto the shelf. In another preferred form, the feed inlet is located at or towards the top of the shelf.

In one particularly preferred form, the method comprises the step of dividing the feedwell into a mixing zone for dissipating the kinetic energy of a liquid suspension or pulp therein and a settling zone for promoting flocculation, Preferably, the method further comprises the step of locating the shelf between the mixing zone and the settling zone. Preferably, the locating step comprises the shelf at least partially defining the boundary between the mixing zone and the settling zone.

Preferably, the method comprises at least partially defining the mixing zone with at least one deflecting element. Preferably, the at least one deflecting element comprises one or more openings for fluid flow from the mixing zone into the settling zone.

Preferably, the at least one deflecting element extends substantially horizontally. More preferably, at least one deflecting element comprises one or more vanes extending radially within the feedwell. Preferably, the method comprises the step of inclining the vanes relative to a horizontal plane of the feedwell. Alternatively, the at least one deflecting element comprises a substantially horizontal plate.

A seventh aspect of the invention provides a method of separating pulp from a fluid, the method comprising the steps of forming a mixing zone for dissipating the kinetic energy of the fluid, forming a settling zone for promoting flocculation of the pulp and positioning at least one inclined deflecting element for at least partially separating the mixing zone from the settling zone.

Preferably, the at least one inclined deflecting element restricts fluid flow from the mixing zone into the settling zone. More preferably, the at least one inclined deflecting element temporarily retains the fluid within the mixing zone before permitting the fluid to flow into the settling zone.

Preferably, the at least one inclined deflecting element has an inner end and an outer end with respect to the feedwell, the method further comprising raising one of the inner and outer ends is relative to the other of the inner and outer ends. In one preferred form, the inner end is raised relative to the outer end.

Preferably, the method comprises the step of extending the at least one inclined deflecting element radially from a central axis of the feedwell. More preferably, the central axis is substantially vertical.

Preferably, the method comprises the step of inclining the at least one inclined deflecting element with respect to a horizontal plane of the feedwell. Preferably, the method comprises the step of inclining the at least one inclined deflecting element with respect to a vertical plane of the feedwell. In one preferred form, the vertical plane is coincident with the central axis. In another preferred form, the method comprises the step of inclining the at least one deflecting element is radially inward with respect to the feedwell, In a particularly preferred form, the method comprises the step of inclining the at least one inclined deflecting element with respect to both the horizontal and vertical planes.

Preferably, the at least one inclined deflecting element comprises two or more portions, of which at least one portion is inclined, More preferably, the at least one inclined deflecting element portion has an inner end and an outer end with respect to the feedwell, wherein one of the inner and outer ends is raised relative to the other of the inner and outer ends. In one preferred form, the inner end is raised relative to the outer end. In another preferred form, the at least one inclined deflecting element portion is inclined radially inward relative to the feedwell chamber.

Preferably, the method comprises the step of connecting the at least one inclined deflecting element at one end to a shelf of the feedwell. More preferably, the method comprises connecting an outer end of the at least one inclined deflecting element to the shelf.

Preferably, the method comprises connecting at least two deflecting element portions by their respective ends to form the at least one deflecting element. More preferably, at least two deflecting element portions each have an inner end and an outer end with respect to the feedwell, wherein one of the inner and outer ends is raised relative to the other of the inner and outer ends. In one preferred form, the at least two deflecting element portions are connected at their respective inner and outer ends. In another preferred form, the at least two deflecting element portions alternate between an upward and downward inclination with respect to the horizontal or vertical plane.

Preferably, the at least one deflecting element comprises a plurality of deflecting elements.

Preferably, the method comprises the step of spacing the deflecting elements apart to define the one or more openings. In one preferred form, the at least one inclined deflecting element comprises one or more baffles. In a particularly preferred form, the at least one inclined deflecting element comprises one or more planar vanes.

Preferably, the method comprises the step of providing the at least one inclined deflecting element with one or more openings to permit fluid flow from the mixing zone into the settling zone. More preferably, the at least one inclined deflecting element comprises a frusto-conical section having one or more openings in its surface.

An eighth aspect of the invention provides a method for discharging fluid comprising pulp from a feedwell into a separation device, the method comprising the steps of providing an inlet for receiving the fluid, providing at least two outlets for discharging the fluid into the separation device and arranging the at least outlets in a substantially concentric relationship with respect to each other.

Preferably, the method includes a step of arranging the outlets adjacent to each other. More preferably, the outlets are substantially annular.

Preferably, the method comprises providing at least one deflection surface that at least partially defines at least one of the outlets. More preferably, the method comprises configuring the at least one deflection surface to at least partially define two or more conduits or passages for guiding fluid flow toward to the outlets.

Where there are two deflection surfaces, the method preferably comprises disposing the deflection surfaces substantially coaxially or concentrically with respect to each other, It is also preferable that the method comprises configuring the deflection surfaces to complement each other in shape to minimise their respective heights or depths relative to the separation device, More preferably, the method comprises disposing the deflection surfaces in a nested relationship to each other.

Preferably, the deflection surfaces are substantially conical or frusto-conical in shape. In one preferred form, the deflection surfaces are frusto-conical in shape. In another preferred form, an inner deflection surface is conical in shape and an outer deflection surface is frusto-conical in shape.

Preferably, the method comprises providing an inner deflection surface and an outer deflection surface, to respectively define inner and outer conduits and inner and outer outlets, According to a ninth aspect of the invention, there is provided a method of feeding a fluid comprising pulp into a feedwell, comprising the steps of providing a feed inlet for receiving the fluid from a first conduit and providing a second conduit for connecting the first conduit and the feed inlet in fluid communication, wherein the first conduit has a first cross-sectional size and/or shape and the feed inlet has a second cross-sectional size and/or shape different to the first cross-sectional size and/or shape, the method further comprising varying a portion of the second conduit in its cross-sectional size and/or shape to fluidly connect the feed inlet to the first conduit.

Preferably, the method comprises providing the second conduit with an inlet fluidly connectable to the first conduit and an outlet fluidly connectable to the feed inlet. In one preferred form, the method comprises forming the second conduit outlet with a cross-sectional size and/or shape that is substantially the same as the second cross-sectional size and/or shape.

Preferably, the method comprises varying the second conduit portion to form at least a partially continuous transition from the first cross-sectional size and/or shape to the second cross-sectional size and/or shape. In one embodiment, the method comprises varying the second conduit in its cross-sectional size and/or shape along its substantially entire length to provide a continuous transition from the first cross-sectional size and/or shape to the second cross-sectional size and/or shape.

Preferably, the method comprises forming the feed inlet with a height less than the height of the first conduit. More preferably, the method comprises forming the feed inlet with a width greater than the width of the first conduit. In one embodiment, the method comprises forming the feed inlet in a generally rectangular shape, having a width to height ratio of at least 1.2:1.

Preferably, the method comprises configuring the second conduit such that the fluid is fed substantially tangentially into the feedwell, or at least includes a tangential component of velocity upon entry into the feedwell.

Preferably, the method comprises configuring the cross-sectional area of the feed inlet so as to be substantially equal to the cross-sectional area of the first conduit. More preferably, the method comprises configuring the second conduit such that the velocity of the fluid entering the feedwell from the feed inlet is substantially the same as the velocity of the fluid entering the second conduit from the first conduit.

Preferably, the method comprises configuring the feed inlet to feed fluid into an upper portion or section of the feedwell, The method preferably comprises configuring the feed inlet to feed fluid into the upper 75% of the feedwell, more preferably the upper 50% of the feedwell and even more preferably the upper 30% of the feedwell.

Preferably, the method comprises configuring the second conduit portion such that the obvert of the first conduit is higher than the obvert of the feed inlet. That is, the ceiling of the first conduit is higher than the ceiling of the feed inlet. Alternatively, the method comprises configuring the second conduit portion such that the invert of the first conduit is lower than the invert of the feed inlet. That is, the floor of the first conduit is lower than the floor of the feed inlet.

In one preferred form, the method comprises forming the first conduit as a feed pipe upstream of the feedwell. Alternatively, the method comprises forming the first conduit as a feed line, channel (open and closed) or trough upstream of the feedwell.

According to a tenth aspect of the invention, there is provided a method for separating pulp from a fluid, comprising the steps of providing a feedwell, forming a outer mixing zone within the feedwell for dissipating the kinetic energy of the fluid, forming an inner settling zone in the feedwell for promoting flocculation of the pulp and disposing a partition for partially separating the outer mixing zone and the inner settling zone.

Preferably, the method comprises configuring the partition to release feed pulp from the outer mixing zone into the settling zone, thereby inhibiting the build up of feed pulp in the outer mixing zone.

Preferably, the method comprises providing the partition with one or more openings for releasing the feed pulp from the outer mixing zone into the inner settling zone. Preferably, the method comprises providing one or more guiding elements associated with the one or more openings for guiding the feed pulp from the outer mixing zone into the inner settling zone. More preferably, the method comprises locating the one or more guiding elements adjacent or at the respective edges of the one or more openings. Preferably, the method comprises extending the one or more guiding elements partially into the inner settling zone. In one preferred form, the one or more guiding elements comprise substantially planar plates.

Preferably, the method comprises arranging the one or more guiding elements circumferentially around the partition. More preferably, the method comprises arranging the one or more guiding elements substantially longitudinally with respect to the partition, Preferably, the method comprises disposing the partition so as to be substantially coaxial with the feedwell. In one preferred form, the partition is substantially vertical. In another preferred form, the partition is cylindrical. In a further preferred form, the partition is frusto-conical in shape.

Preferably, the partition at least partially defines the outer mixing zone and the inner settling zone. In one preferred form, the outer mixing zone is substantially annular in shape.

Preferably, the method comprises arranging the outer mixing zone and the inner settling zone in a substantially concentric relationship to each other. In one preferred form, the outer mixing zone and the inner settling zone are adjacent to each other.

Preferably, the method further comprises disposing a lower settling area in the feedwell below the inner settling zone.

More preferably, the method comprises disposing the lower settling area below the inner settling zone and the outer mixing zone.

Preferably, the separation device is a thickener.

BRIEF DESCRIPTION OF THE DRAWINGS

Preferred embodiments of the invention will now be described, by way of example only, with reference to the accompanying drawings in which:

FIG. 31b is a cross-sectional view of the feedwell of FIG. 31a;

FIG. 32b is a cross-sectional view of the feedwell of FIG. 32a;

FIG. 33b is a cross-sectional view of the feedwell of FIG. 33a.

PREFERRED EMBODIMENTS OF THE INVENTION

Figure 1:
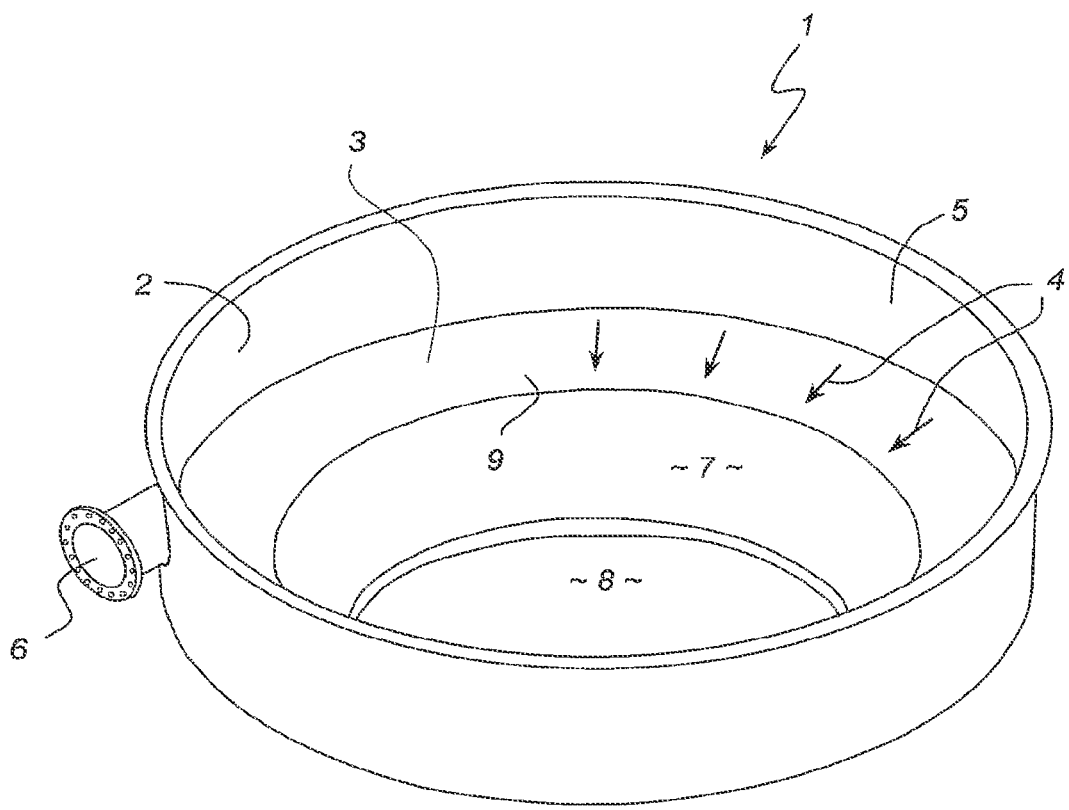
FIG. 1 is a perspective view of a feedwell for a thickener according to a first embodiment of the invention.

A preferred application of the invention is in the fields of mineral processing, separation and extraction, whereby finely ground ore is suspended as pulp in a suitable liquid medium such as water at a consistency which permits flow, and settlement in quiescent conditions. The pulp is settled from the suspension by a combination of gravity with chemical and/or mechanical processes. The pulp gradually clumps together to form aggregates of larger pulp particles as it descends from the feedwell towards the bottom of the tank. This is typically enhanced by the addition of flocculating agents, also known as flocculants, which bind the settling solid or pulp particles together. These larger and denser pulp aggregates settle more rapidly than the individual particles by virtue of their overall size and density relative to the surrounding liquid, gradually forming a compacted arrangement within a pulp bed at the bottom of the tank Referring to FIGS. 1 to 3, a feedwell 1 according to a first embodiment of the invention comprises a sidewall 2 and a substantially annular shelf 3 defining an inclined path 4 for removal of flocculated solids from the shelf and inhibiting or preventing the build up of flocculated solids thereon. The sidewall 2 comprises an upper cylindrical section 5 having a feed inlet 6 and a lower frusto-conical section 7 terminating at an outlet 8. The sidewall 2, upper section 5 and lower section 7 generally define the feedwell chamber. It will be appreciated that in other embodiments, the feedwell is substantially cylindrical in shape so that it has an open bottom and does not have a lower frusto-conical section 7.

The feedwell 1 is generally centrally located within a tank of a separation device (not shown), such as a clarifier or thickener, although it can be located elsewhere in the tank. Generally, feed liquid flows firstly from the inlet 6 into the feedwell 1 and then out to the tank via the outlet 8.

The annular shelf 3 adjoins the sidewall 2 at its upper section 5 and is inclined downwardly and radially inwardly towards the feedwell interior to define the inclined path 4, at an angle α of substantially between 10° and 15° relative to the horizontal plane. Thus, any flocculated solids tend to move generally along the inclined path 4 and off the shelf 3 into interior of the feedwell chamber. As a consequence, there is little or no accumulated "mud" on the shelf 3. In addition, the shelf 3 is configured so that the inclined path 4 is able to release built up solids without compromising the function of the shelf in retaining slurry in the feedwell 1 for a relatively longer residence time than would otherwise be the case, to enhance mixing and flocculation.

In addition, the shelf 3 has a substantially planar surface 9 and extends longitudinally along the sidewall 2 around the circumference of the upper section 5. The planar surface 9 ensures that flocculated solids do not accumulate elsewhere on the shelf 3, while due to its extension around the circumference of the sidewall 2, the shelf enables uniform distribution of flocculated solids toward the centre of the feedwell interior.

The feed inlet 6 is arranged in the upper section 5 such that a liquid suspension or pulp enters the feedwell 1 substantially tangentially with respect to the sidewall 2. As a consequence, the inlet 6 feeds the liquid suspension or pulp over and/or onto the shelf 3, thereby assisting retention thereof in the feedwell 1. It also increases energy dissipation of the incoming suspension, as the liquid suspension or pulp tends to circulate along the shelf 3, staying longer in the feedwell 1, thus enhancing mixing with flocculating agents added into the feedwell, This is further assisted by locating the feed inlet 6 at or towards the top of the shelf 3, as defined by the planar surface 9.

The outlet 8 has an area substantially less than the mean cross-sectional area of the feedwell chamber, as defined by the sidewall 2, to restrict the flow of liquid between feedwell 1 and the tank, thereby promoting smooth, non-turbulent flow and homogenous distribution of liquid within the tank. It will be appreciated that in other embodiments, the outlet 8 has an area substantially the same as or greater than the mean cross-sectional area of the feedwell chamber, For example, where the lower section 7 is substantially cylindrical and not frusto-conical in shape, the outlet 8 can be formed to have the same or greater area compared to the mean cross-sectional area defined by the sidewalls 2.

In operation, a liquid suspension or pulp in the form of a slurry is fed tangentially into the feedwell 1 through the inlet 6. Due to the tangential entry of the slurry and its placement onto the shelf 3, the slurry tends to circulate within the feedwell 1, ensuring that there is sufficient residence time for mixing and reaction with the reagents, such as flocculating agents, to create agglomerations or "flocs" of heavier density solids. In addition, the kinetic energy of the slurry gradually dissipates in the feedwell 1. As the mixture accumulates in the feedwell 1, any flocculated solids that could build up on the planar surface 9 tend to move along the inclined path 4, and off the shelf 3 into interior of the feedwell chamber. As additional slurry is introduced into the feedwell, it circulates and creates a continuous flow along the shelf 3, in effect "washing" the flocculated solids along the inclined path 4 and off the shelf. The liquid then flows downwardly under gravity though the lower section 7 towards the restricted outlet 8 for dispersal into the surrounding tank. Thus, it can be appreciated by one skilled in the art that the inclined path 4 enables solids to be released or removed from the shelf 3 into the feedwell chamber, thus inhibiting or substantially preventing the build up of solids and its formation into a sticky mud on the shelf 3.

In the tank, the aggregates formed within and released from the feedwell form a relatively dense bed of thickened pulp that displaces an upper layer of relatively dilute liquid towards the top of the tank. The thickened pulp is drawn off from below through an underflow withdrawal pipe, while the dilute liquor is progressively drawn off through an overflow launder.

Figure 4:
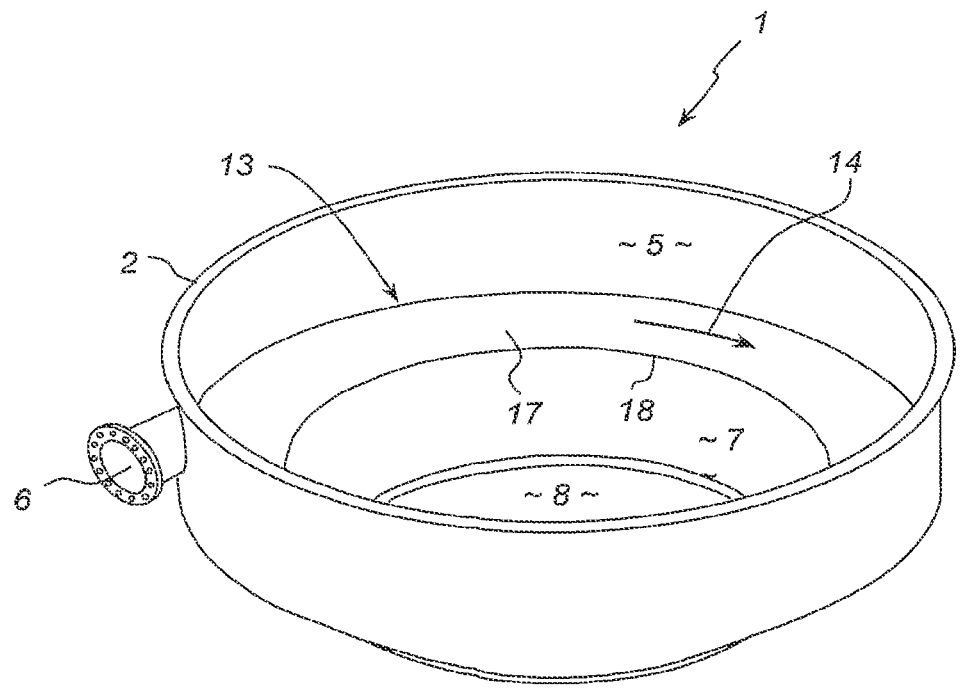
FIG. 4 is a perspective view of a feedwell for a thickener according to a second embodiment of the invention.
Figure 5:
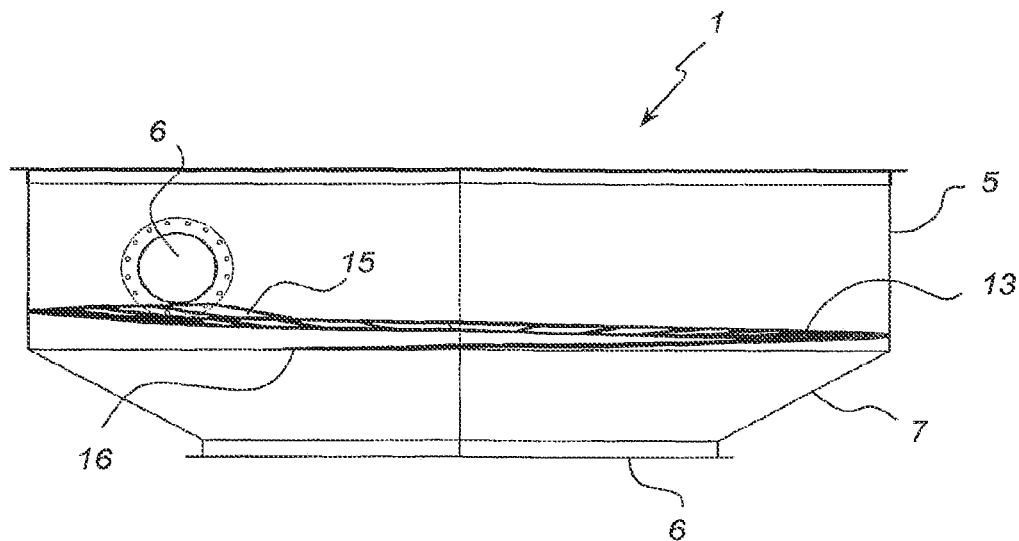
FIG. 5 is a cross-sectional view of the feedwell of FIG. 4.
Figure 6:
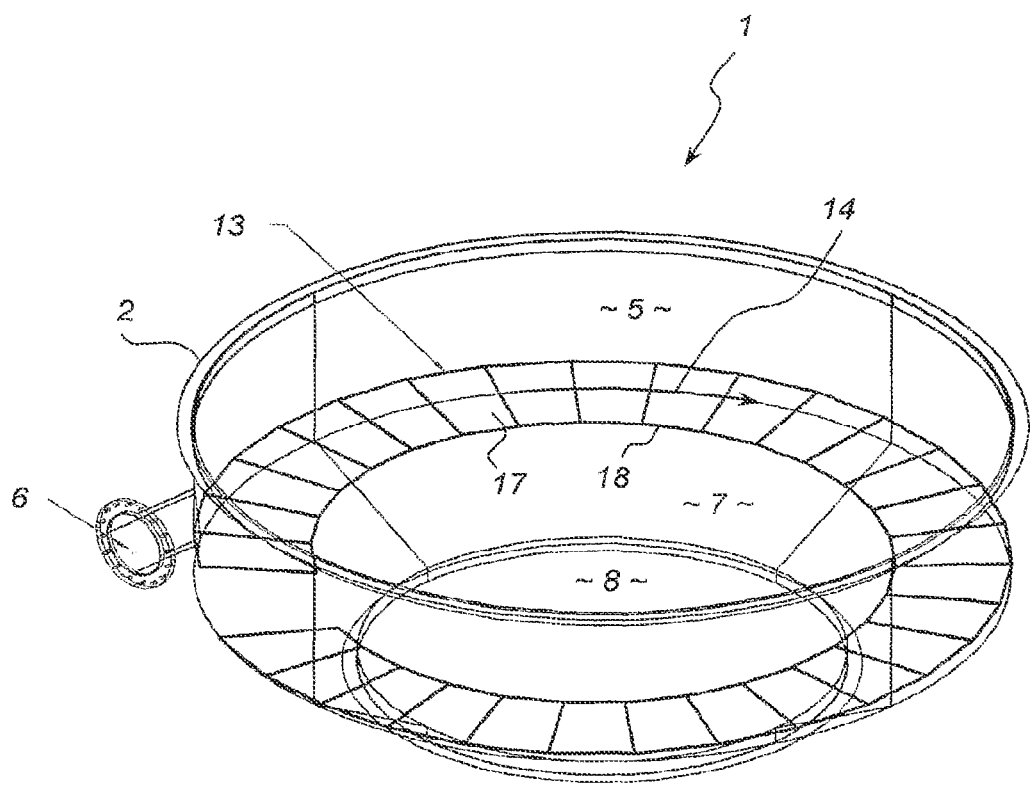
FIG. 6 is a transparent perspective view of the feedwell of FIG. 4.

A second embodiment of the invention is illustrated in FIGS. 4 to 6, where corresponding features have been given the same reference numerals. In this embodiment, the feedwell 1 has a helically shaped shelf 13 defining an inclined path 14, as best shown in FIGS. 4 to 6. The shelf 13 starts at an upper edge 15 located adjacent the feed inlet 6 and terminates at a lower edge 16 located below the upper edge 15 after traversing substantially around the circumference of the upper section 5. The inclined path 14 extends in the longitudinal direction of the shelf 13, thus defining a circumferential inclination with respect to the sidewall 2. In other words, the circumferential inclination derived from the helical shape of the shelf 13 defines the inclined path 14 for removal of solids from the shelf 13. The gradient of circumferential inclination should be relatively small, so as to permit solids to move along the shelf without adversely affecting energy dissipation of the liquid suspension or pulp as it traverses along the shelf 13. The gradient is preferably between 2° to 10° with respect to the horizontal plane, more preferably between 2° and 6°.

Figure 2:
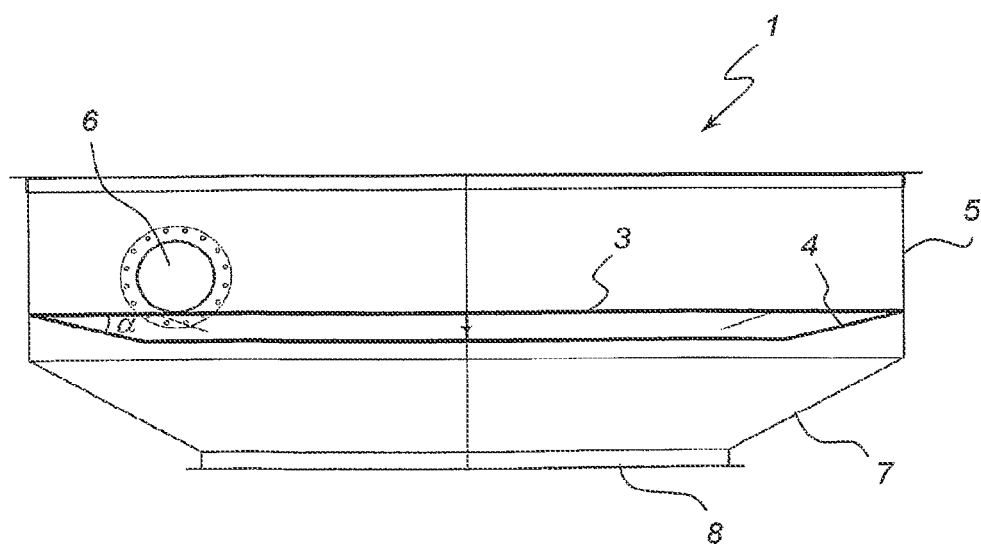
FIG. 2 is a cross-sectional view of the feedwell of FIG. 1.
Figure 3:
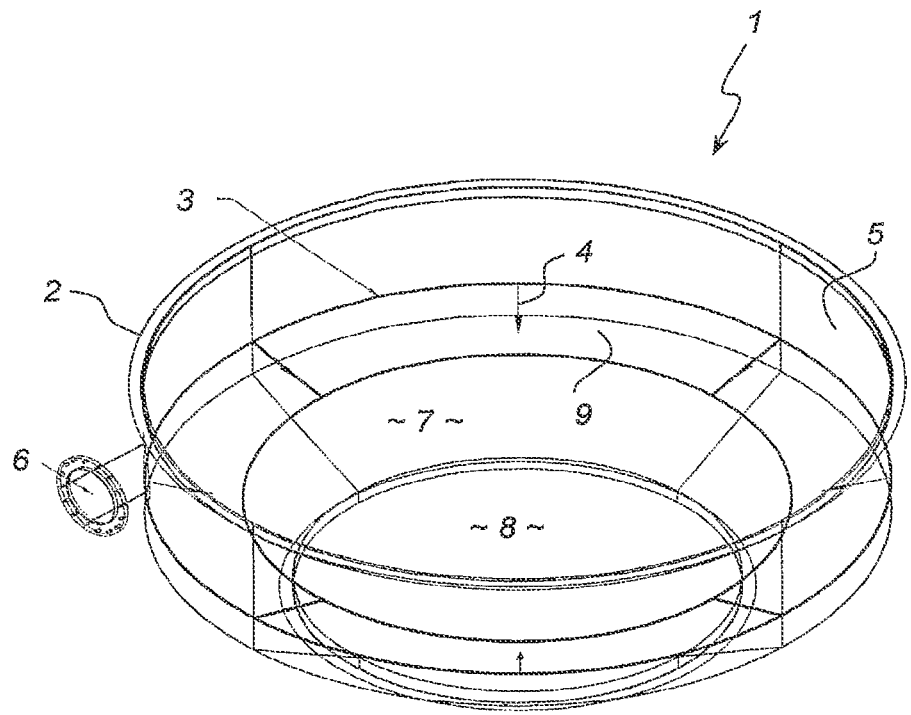
FIG. 3 is a transparent perspective view of the feedwell of FIG. 1.

The shelf 13 functions in a substantially similar manner as described in relation to the first embodiment described in FIGS. 1 to 3. That is, feed slurry enters the feedwell 1 through the feed inlet 6 adjacent to a substantially planar surface 17 of the shelf 13. Due to the tangential entry of the slurry, and its deposition onto the shelf 13, the slurry tends to circulate within the feedwell 1, providing sufficient residence time for mixing and reaction with flocculating agents. In addition, the kinetic energy of the slurry progressively dissipates in the feedwell during this time. Any flocculated solids that could build up on the planar surface 17 tend to follow the inclined path 14 along the shelf 13 and off the lower edge 16 into interior of the feedwell chamber. The continuous flow of slurry created within the feedwell 1 also results in flocculated solids being washed along the inclined path 14 and off either a longitudinal edge 18 or the lower edge 16 of the shelf 13 into the feedwell chamber, The liquid then flows downwardly under gravity through the lower section 7 towards the restricted outlet 8 for dispersal into the surrounding tank, as previously described. Again, it will be appreciated that where there is no narrowed lower section 7 or restricted outlet 8 (for example, where the lower section 7 is substantially cylindrical, thus defining an open bottom for the outlet 8), then the liquid flows downwardly under gravity through the open bottom for dispersal into the tank.

Figure 7:
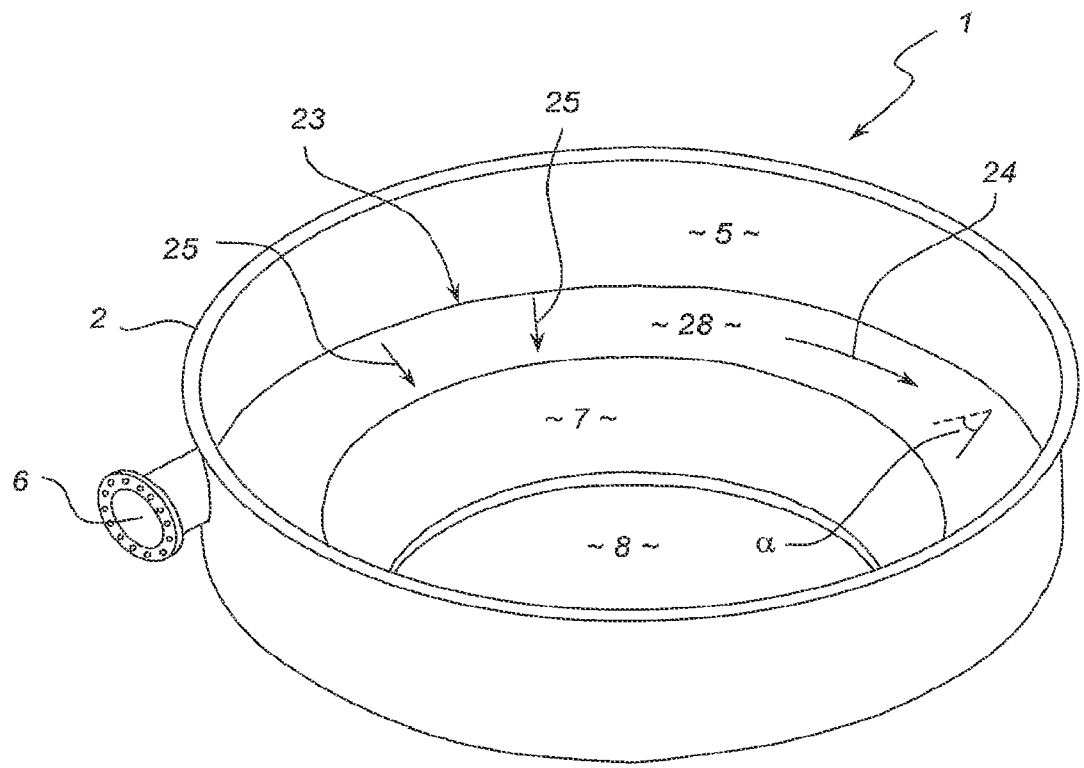
FIG. 7 is a perspective view of a feedwell for a thickener according to a third embodiment of the invention.
Figure 8:
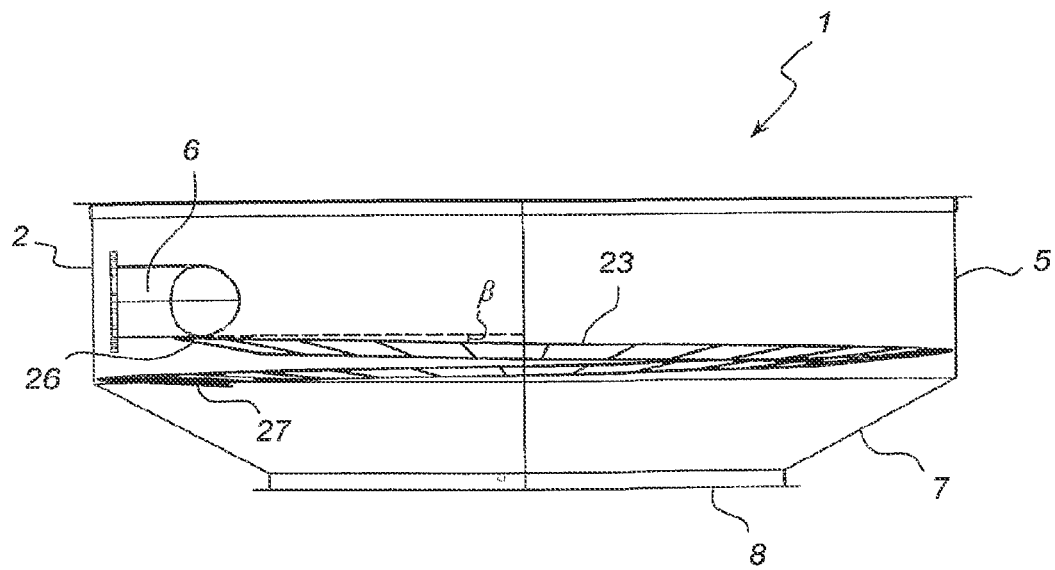
FIG. 8 is a cross-sectional view of the feedwell of FIG. 7.
Figure 9:
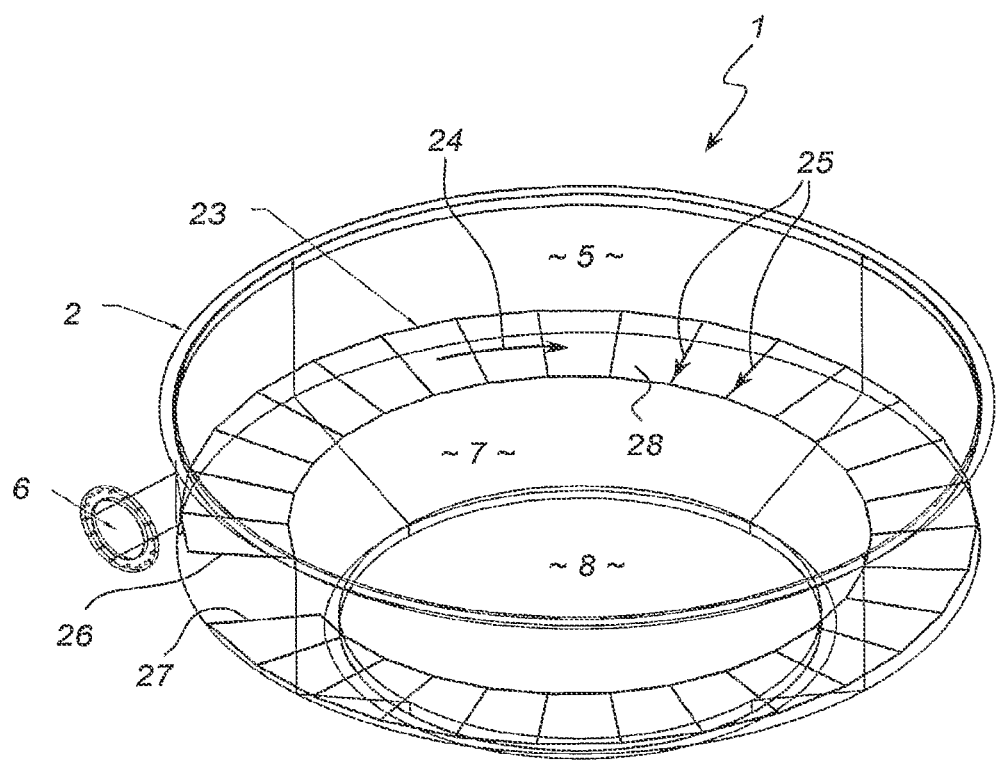
FIG. 9 is a transparent perspective view of the feedwell of FIG. 7.
Figure 10:
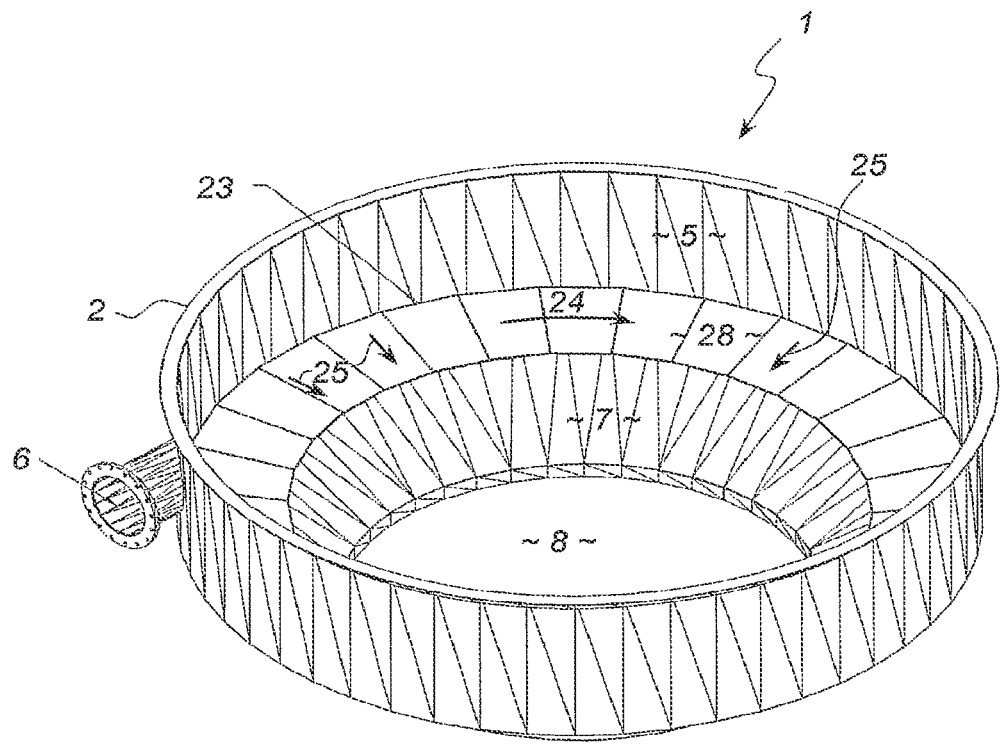
FIG. 10 is another perspective view of the feedwell of FIG. 7.

A third embodiment of the invention is illustrated in FIGS. 7 to 10, where corresponding features have again been given the same reference numerals. This embodiment combined elements of the shelves illustrated in FIGS. 1 to 3 and 4 to 6. In particular, the feedwell 1 is similar to the feedwell of FIGS. 4 to 6 in that the shelf 23 is also helically shaped. However, the shelf 23 is inclined along its longitudinal direction (or circumferentially inclined with respect to the sidewall 2) as well as radially inwardly inclined to define respective inclined paths 24 and 25, as best shown in FIGS. 7, 9 and 10. The shelf 23 starts at an upper edge 26 located adjacent the feed inlet 6 and terminates at a lower edge 27 located below the upper edge 26 after traversing substantially around the circumference of the upper section 5. As in the second embodiment, the gradient β of circumferential inclination should be relatively small, for example, about 2° to 10°, and more preferably between 2° and around 6°, with respect to the horizontal plane, to permit solids to move off the shelf 23 without adversely affecting energy dissipation of the liquid suspension or pulp as it migrates along the shelf. The substantially planar surface 28 of the shelf 23 is inclined downwardly and radially inwardly at an angle α of between 10° to 15° with respect to the horizontal plane. The shelf 23 functions in substantially the same manner as the first and second embodiments, and therefore a detailed description of the operation of this feedwell will not be repeated. However, it is believed that the provision of two inclined paths 24 and 25, one circumferential and the other radial, is more effective in removing solids from the shelf 23 and thus inhibiting or preventing solids building up or accumulating on the shelf while still providing adequate residence time for the feed liquid in the feedwell.

Figure 11:
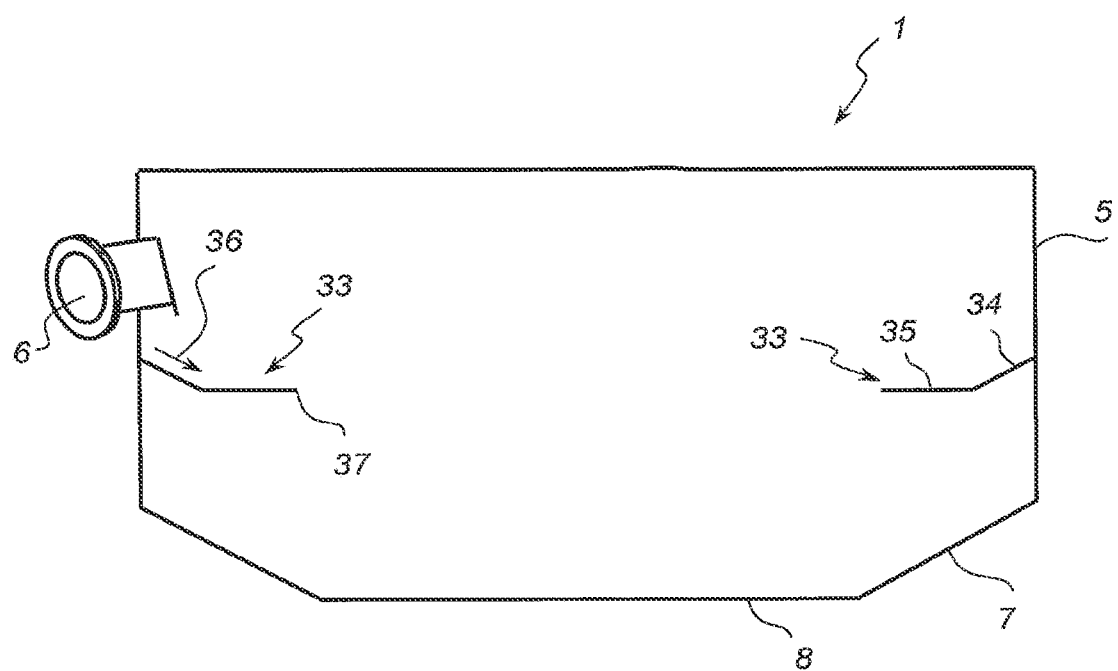
FIG. 11 is a cross-sectional view of a feedwell according to a fourth embodiment of the invention.
Figure 12:
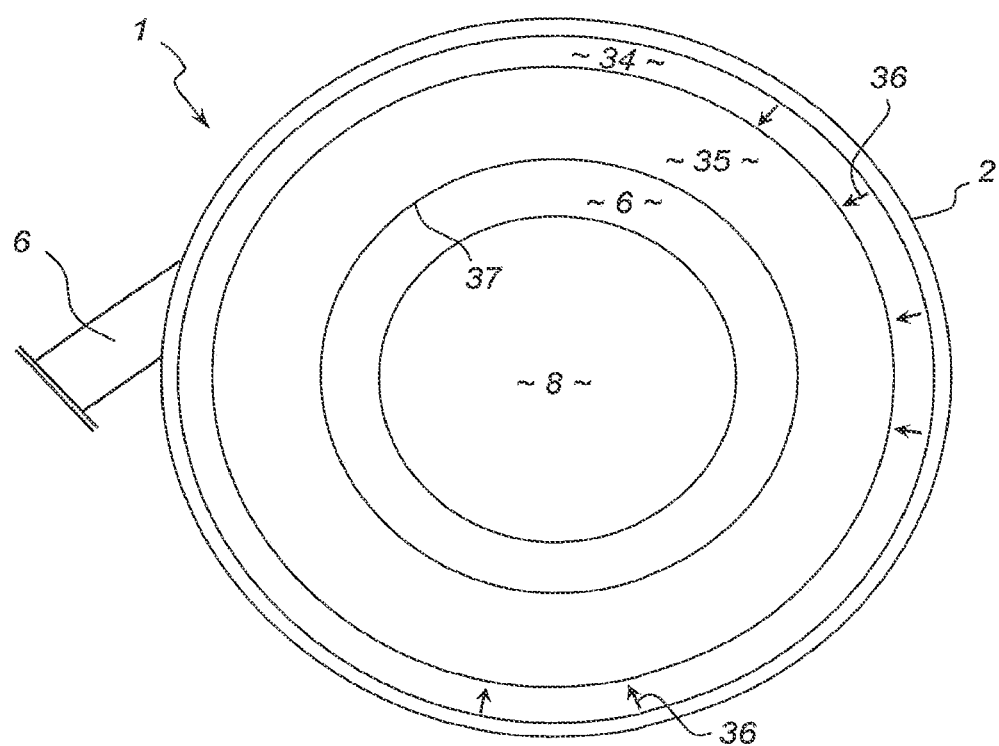
FIG. 12 is a plan view of the feedwell of FIG. 11.
Figure 13:
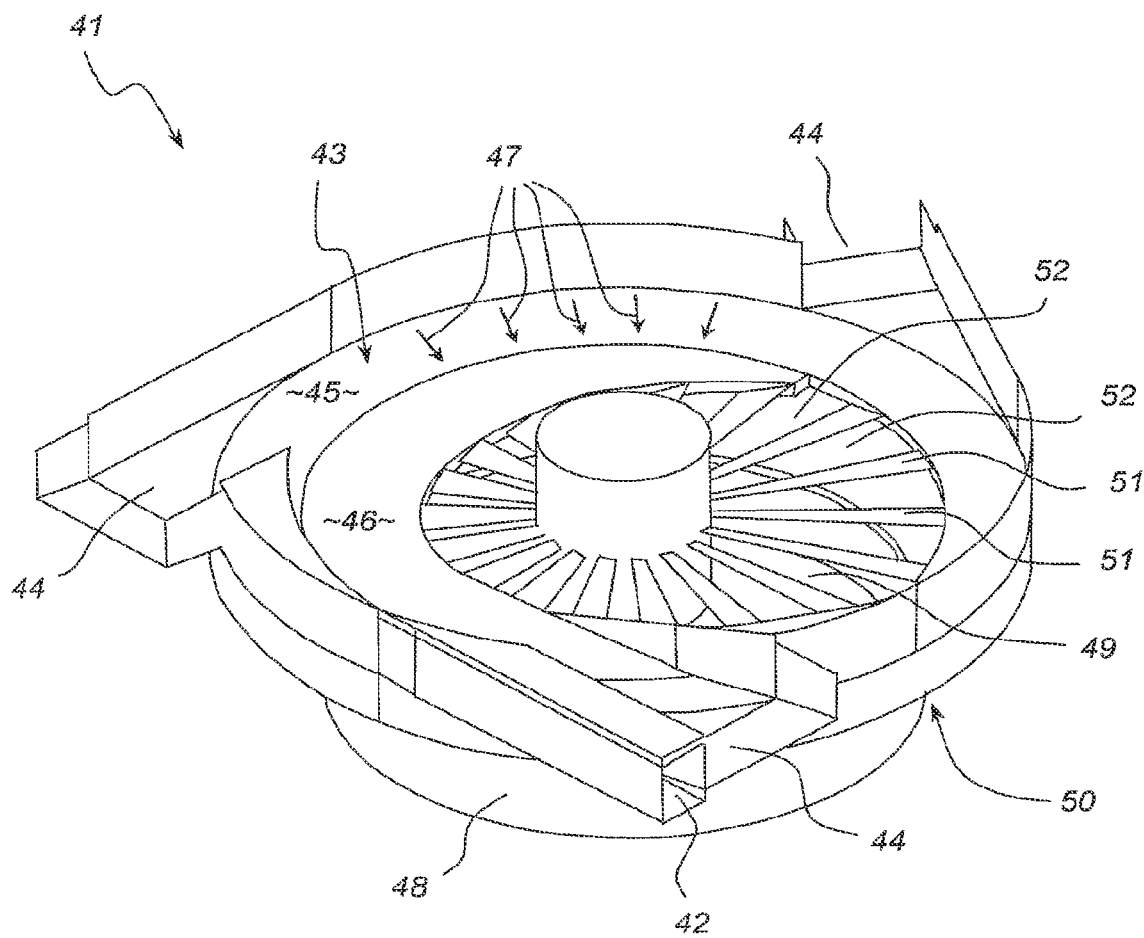
FIG. 13 is a perspective view of a feedwell according to a fifth embodiment of the invention.
Figure 14:
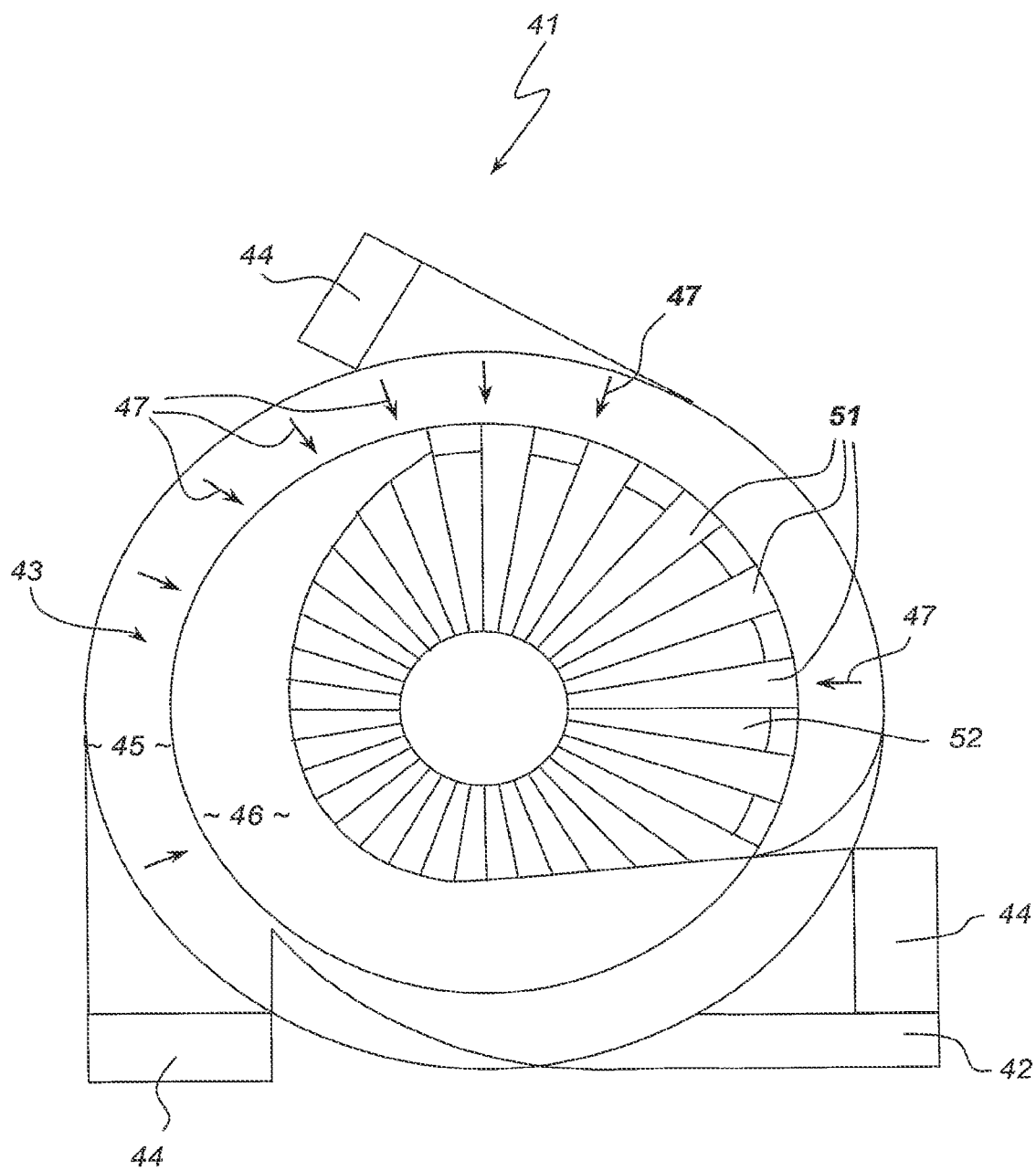
FIG. 14 is a plan view of the feedwell of FIG. 13.
Figure 15:
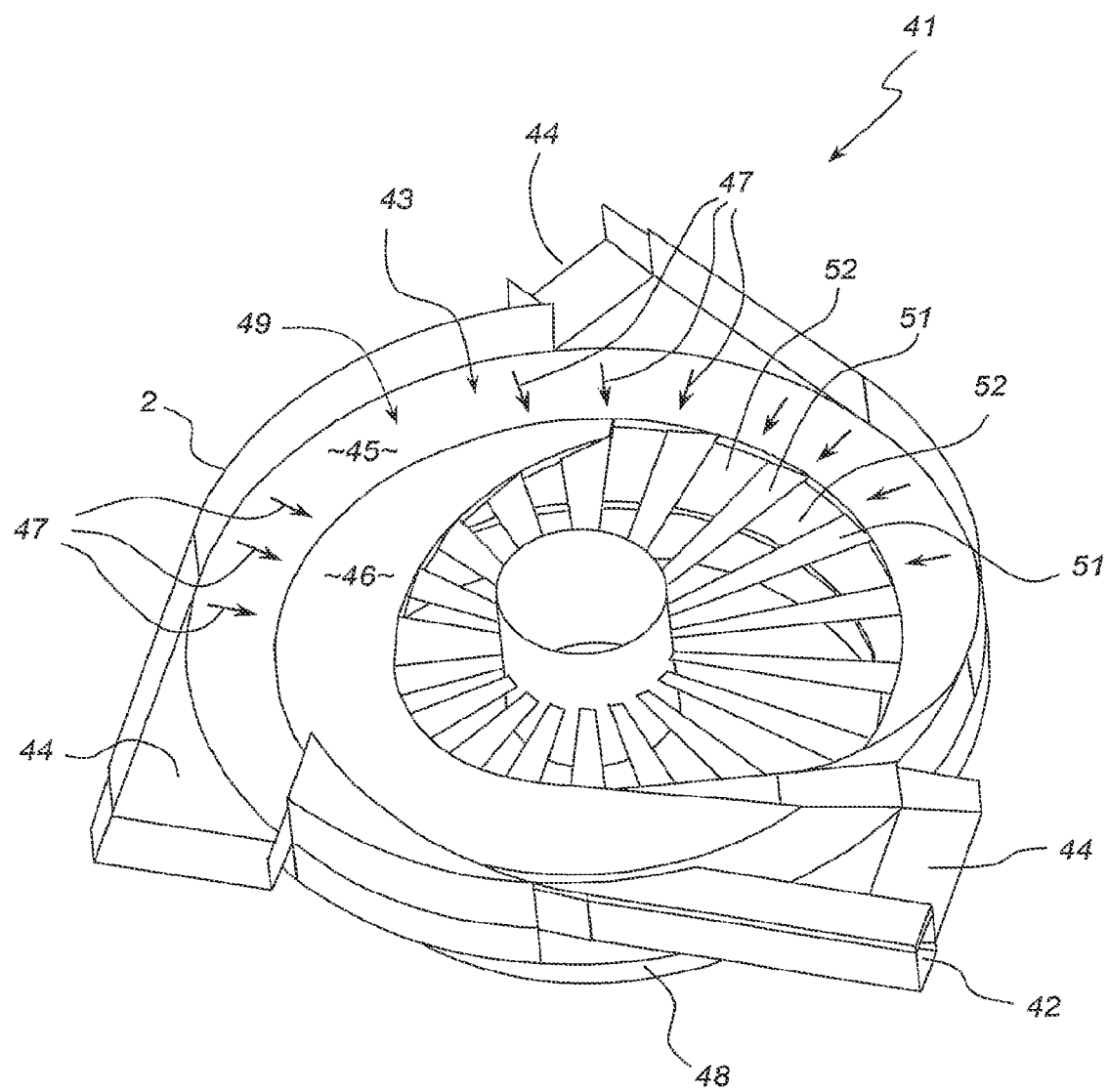
FIG. 15 is another perspective view of the feedwell of FIG. 13.
Figure 16:
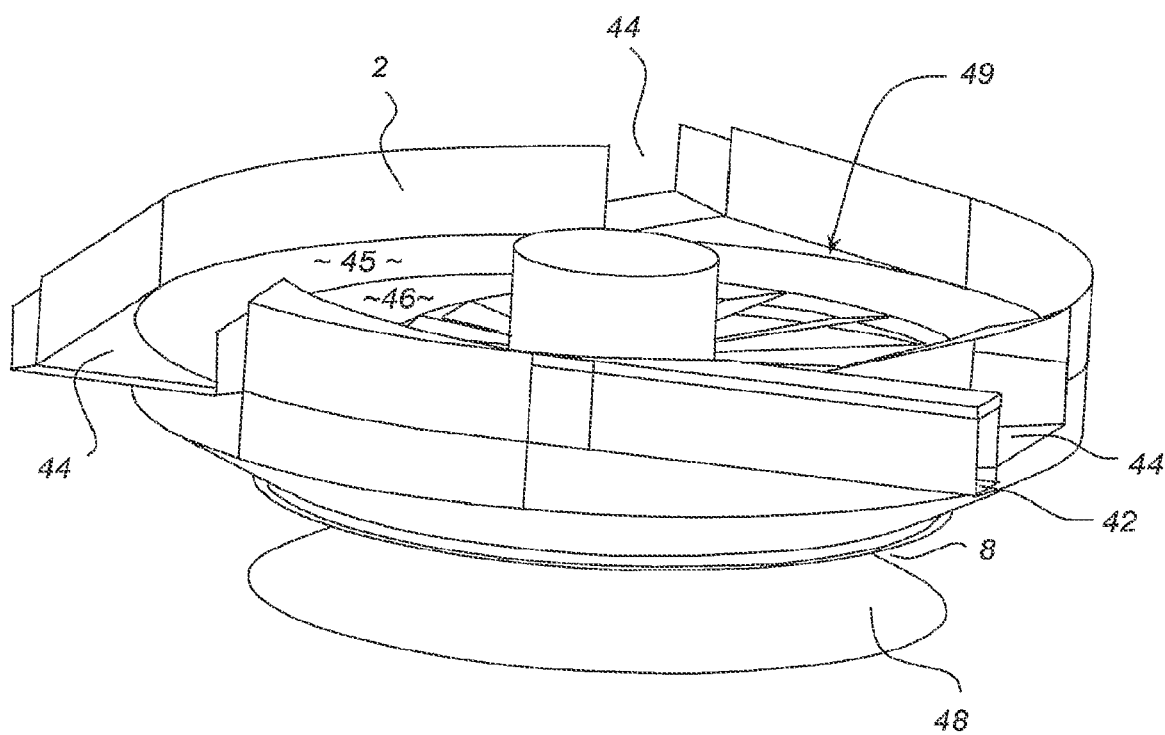
FIG. 16 is a further perspective view of the feedwell of FIG. 13.

A fourth embodiment is illustrated in FIGS. 11 and 12, where corresponding features have been given the same reference numerals. In this embodiment, the generally annular shelf 33 is configured with a radially and inwardly inclined surface 34 and a substantially planar horizontal surface 35. As best shown in FIG. 11, the inclined surface 34 defines an inclined path 36 for removal of solids, which inhibits or prevents the build up of solids at the junction of the shelf 33 with the sidewall 2. The shelf 33 may also be provided with an inclined surface (not shown) at one longitudinal edge 37 to further assist the release of built up solids, This configuration of the feedwell 1 operates in substantially the same manner as described in relation to the first embodiment described in FIGS. 1 to 3, and therefore a detailed description of the operation of this feedwell will not be repeated.

Figure 17:
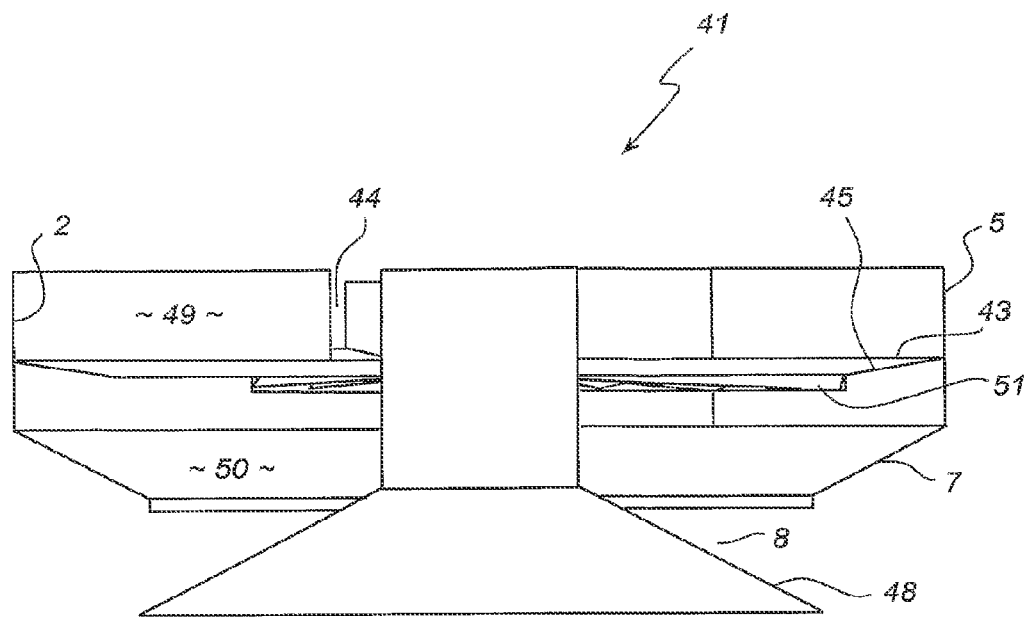
FIG. 17 is a cross-sectional view of the feedwell of FIG. 13.
Figure 18:
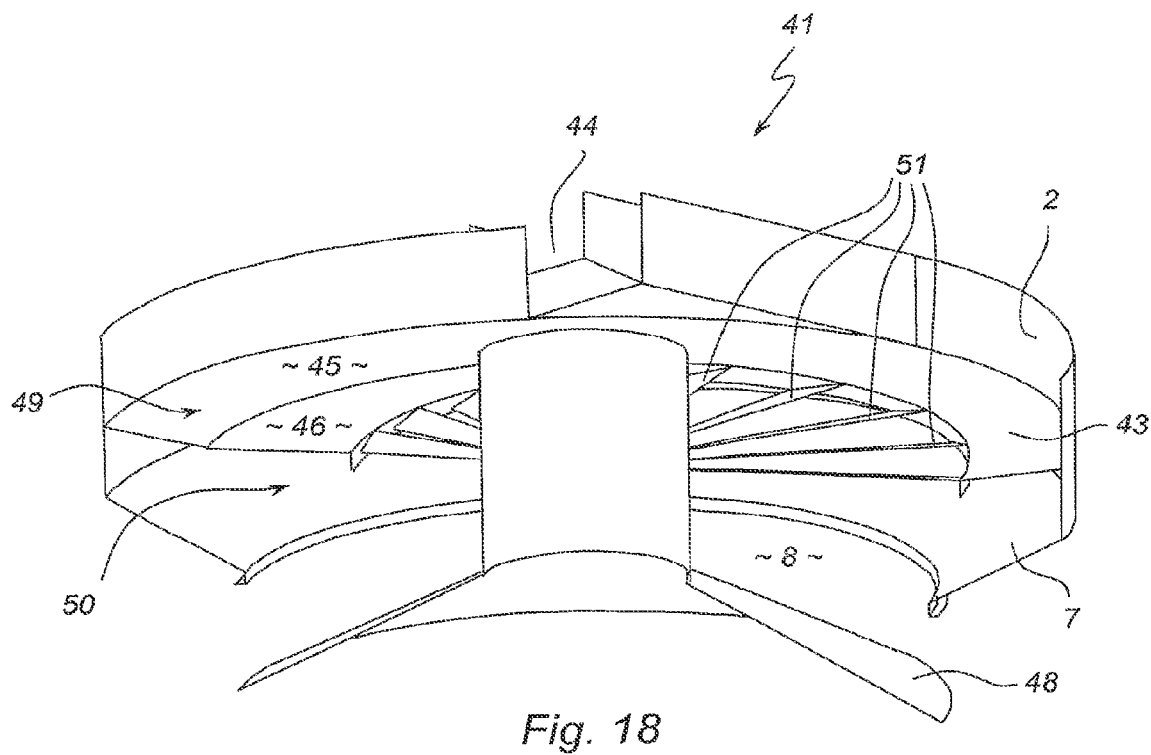
FIG. 18 is a partial cut-away view of the feedwell of FIG. 13.

In a fifth embodiment of the invention illustrated in FIGS. 13 to 18, where corresponding features have been given the same reference numerals, the shelf 33 of the fourth embodiment has been modified to fit into a vane-type feedwell 41. The feedwell 41 has a feed inlet 42 for introducing feed slurry, a shelf 43 and dilution ports 44 for diluting the feed slurry using dilute liquid directly from the thickening tank. The shelf 43 has an annular inclined surface 45 and a partial horizontal surface 46, the inclined surface 45 defining an inclined path 47 for inhibiting the build up of solids on the shelf 43. A frusto-conical diverter 48 partially defines the restricted outlet 8 of the feedwell 41 and deflects the liquid flowing downwardly as it exits the outlet 8, promoting an even distribution of liquid into the tank, In addition, the feedwell 41 has been divided into a mixing zone 49 for dissipating kinetic energy of a liquid suspension or pulp therein and a settling zone 50 for promoting flocculation, with the shelf 43 located between the mixing zone 49 and the settling zone 50, preferably defining the boundary between the these zones with the shelf 43, as best shown in FIGS. 17 and 18. The shelf 43 assists with retention of the feed liquid, thereby enhancing energy dissipation and mixing of the slurry with reagents, such as flocculating agents. While the mixing zone 49 can be at least partially defined by at least one deflecting element, in this embodiment a plurality of deflecting elements are provided and take the form of vanes 51 extending horizontally and radially within the feedwell 41 and inclined relative to the horizontal plane. The vanes 51 are arranged to provide a plurality of openings 52 for fluid to flow from the mixing zone 49 into the settling zone 50. In an alternative configuration, the deflecting element comprises a substantially horizontal plate having one or more openings.

The shelf 43 in this embodiment operates in a similar manner as the shelves of the previously described embodiments. That is, as slurry is continuously fed into the feedwell 41 and initially retained in the mixing zone 49, any flocculated solids on the shelf 43 tend to slide on the inclined surface 45 along the inclined path 47 onto the horizontal surface 46, from where it is washed off by the slurry flowing within the mixing zone 49, or directly off the inclined surface 45 into interior of the feedwell chamber, thus inhibiting or preventing the excessive build up of solids on the shelf 43.

Figure 19:
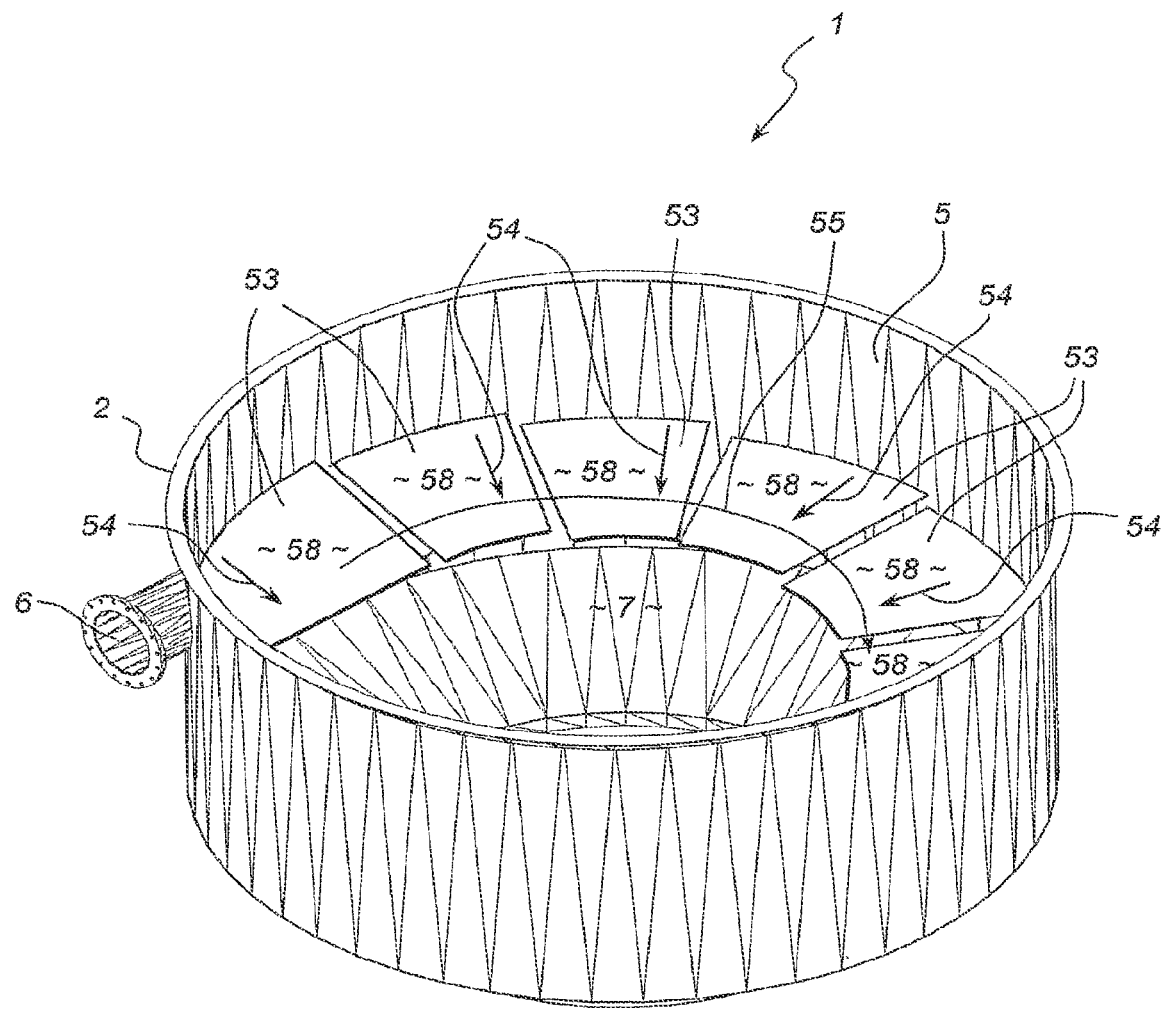
FIG. 19 is a perspective view of a feedwell according to a sixth embodiment of the invention.
Figure 20:
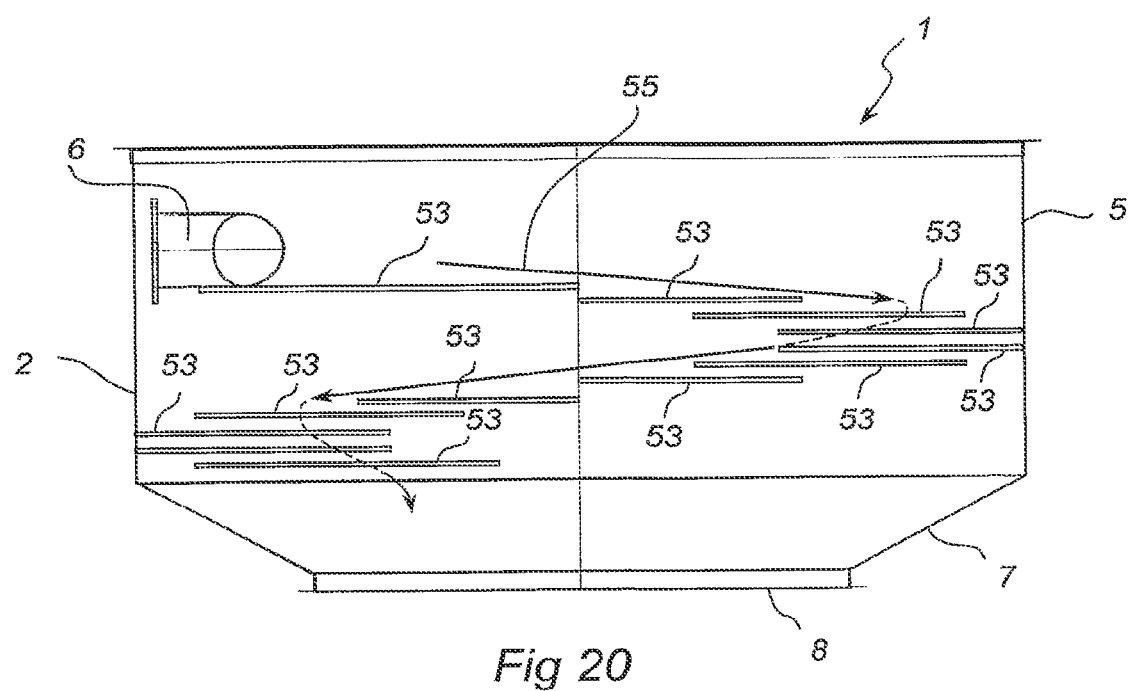
FIG. 20 is a cross-sectional view of the feedwell of FIG. 19.
Figure 21:
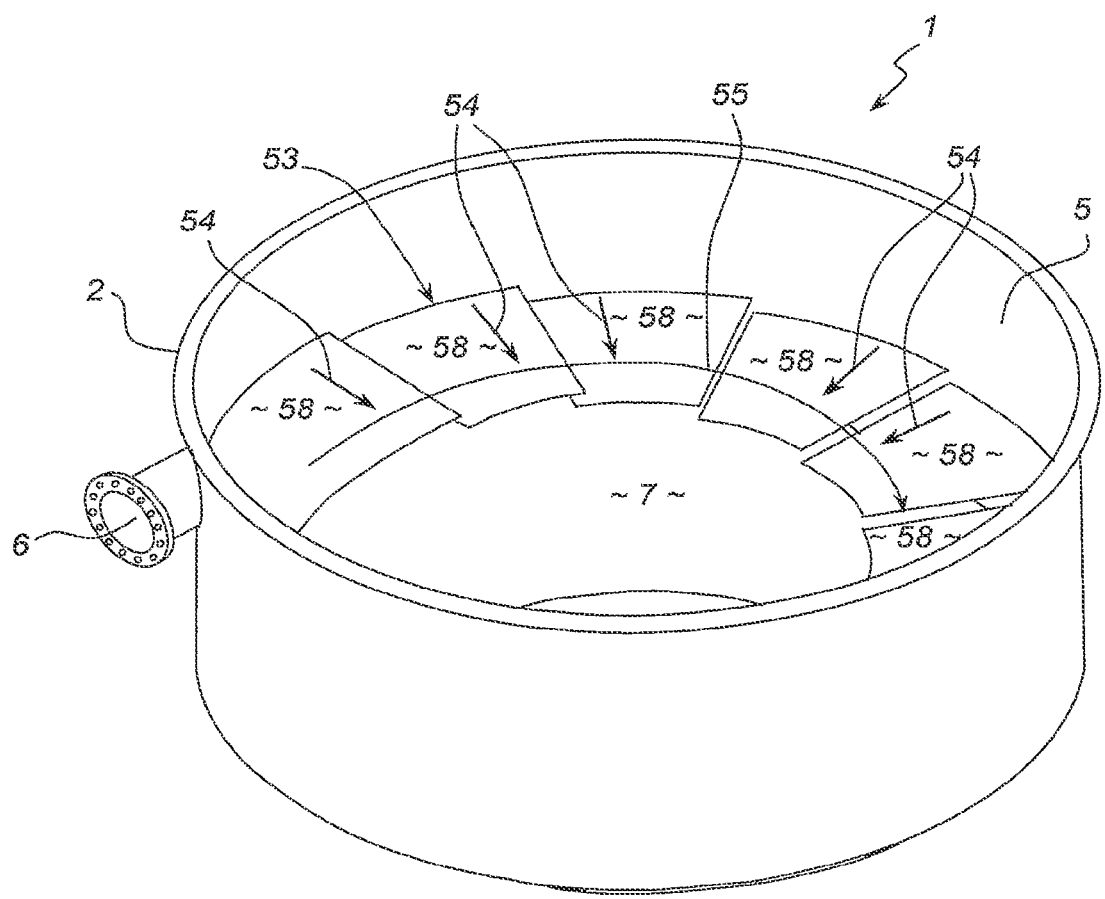
FIG. 21 is a perspective view of the feedwell of FIG. 19.

A sixth embodiment of the invention is illustrated in FIGS. 19 to 21, where corresponding features have been given the same reference numerals. In this embodiment, a plurality of substantially planar shelves 53 are inclined radially inwardly toward the feedwell interior and are circumferentially arranged around the sidewall 2. Thus, each shelf 53 defines a respective radially inclined path 54 and partially defines an additional circumferentially inclined path 55. The plurality of shelves 53 have a stepped profile that collectively defines a helical shape similar to the helical shape of the shelves 13 and 23 of the second and third embodiments in FIGS. 4 to 10, respectively. The shelves 53 are each arranged to extend about 30° around the circumference of the sidewall 2 and to drop vertically approximately 200 mm for each succeeding shelf. Any solids resting on the shelves 53 tend to be swept off each succeeding shelf along the inclined paths 54 and 55 as the slurry circulates in the feedwell 1. The inclined paths 54 have an angle of inclination of substantially between 10° to 15° with respect to the horizontal plane, whereas the additional inclined path 55 has an effective angle of inclination of substantially between 2° and around 10°, more preferably between 2° and around 6°, with respect to the horizontal plane. Thus, this embodiment works in substantially same manner as a combination of the first embodiment of the invention of FIGS. 1 to 3 and the second embodiment of the invention of FIGS. 4 to 6, and therefore a detailed description of the operation of this feedwell will not be repeated.

However, it is believed that the individual shelves 53 additionally move the slurry lower into the feedwell 1 in a more controlled fashion due to the resultant stepped profile. It is also believed that the shelves 53 act as "brakes" to avoid any increase in the flow velocity of the liquid suspension of pulp as it spirals downwardly along the inclined path 55 over the shelves 53. Otherwise, in some embodiments, the increase in flow velocity due to the downwardly spiralling migration of the pulp could compromise the energy dissipation characteristics of the feedwell 1. In other variations of this embodiment, the shelves 53 are circumferentially inclined with respect to the sidewall 2 instead of being inclined radially inwardly. In a further variation, they are both radially inwardly inclined and circumferentially inclined, to thus define three separate inclined paths, being the radially inclined and circumferentially inclined paths of each shelf and the additional circumferentially inclined path 55 denied by all the shelves collectively. In another variation, the shelves 53 are interconnected by surfaces bridging across the gaps between adjacent shelves so as to form an effectively continuous shelf surface. These bridging surfaces may additionally be circumferentially and/or radially inclined. These variations can be combined to produce shelves that are circumferentially and/or radially inwardly inclined, together with bridging surfaces that are also circumferentially and/or radially inwardly inclined.

Referring to FIGS. 22 to 28, a feedwell 100 is illustrated, where corresponding features have been given the same reference numerals. This seventh embodiment incorporates several aspects of the present invention.

Figure 27:
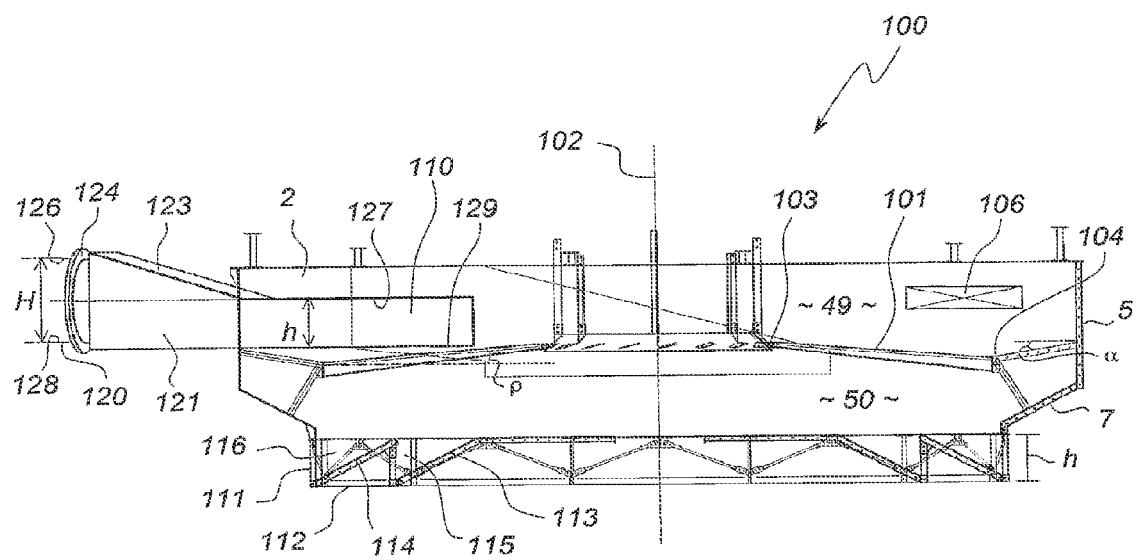
FIG. 27 is a cross-sectional view of the feedwell of FIG. 22.

As in the previously described embodiments of the invention, the feedwell 100 has a substantially annular shelf 3, defining an inclined path 4 for removal of flocculated solids from the shelf and inhibiting or preventing the build-up of those solids thereon, The annular shelf 3 adjoins the sidewall 2 at its upper section 5 and is inclined downwardly and radially inwardly towards the feedwell interior to define the inclined path 4, at an angle $\alpha$ of substantially between 10° and 15° relative to the horizontal plane, as best shown in FIG. 27.

Figure 24:
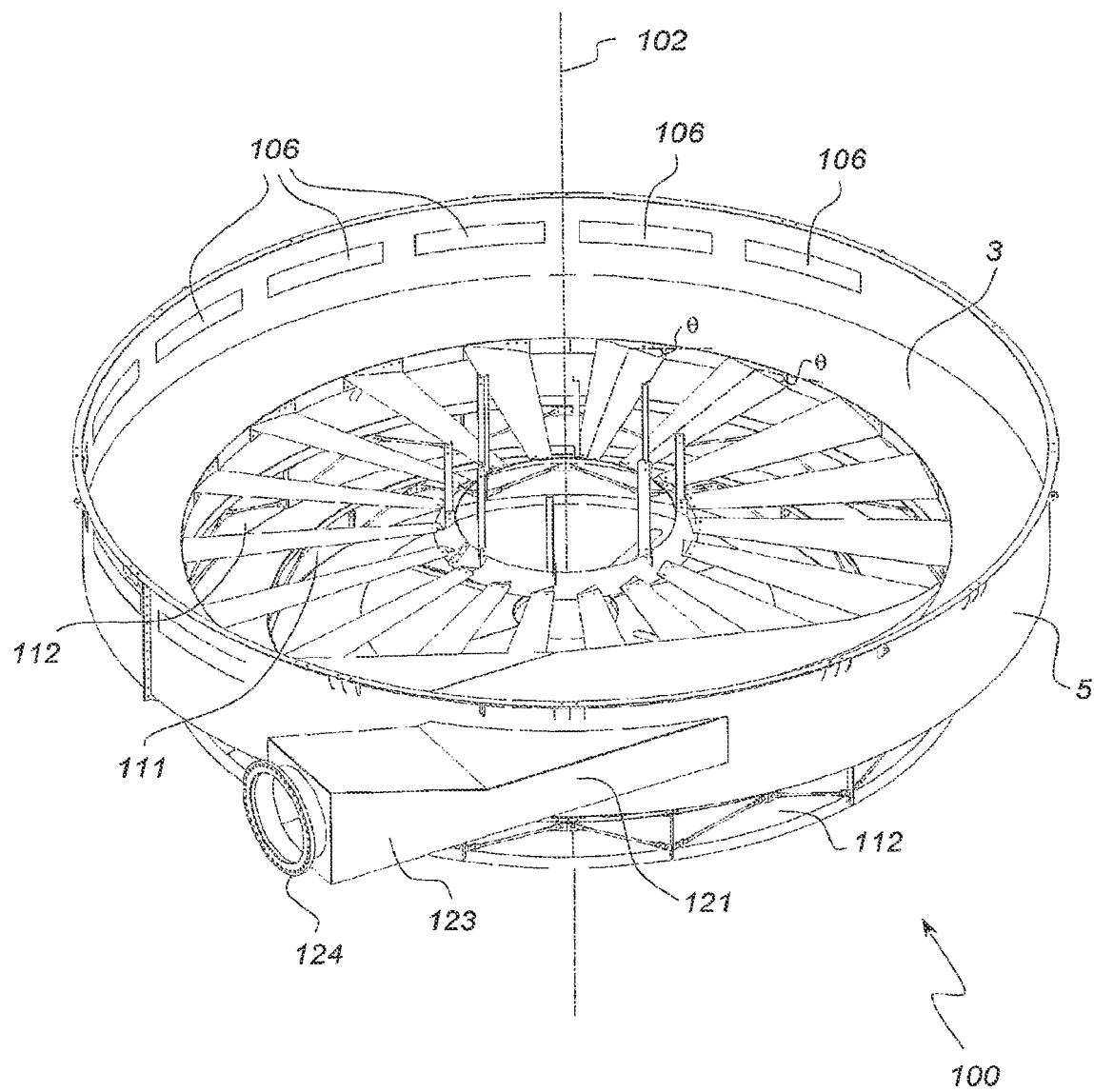
FIG. 24 is a further perspective view of the feedwell of FIG. 22.

The feedwell 100 also comprises a mixing zone 49 for dissipating the kinetic energy of a fluid comprising pulp and a settling zone 50 for promoting flocculation of the pulp, as best shown in FIG. 27. In addition, a plurality of inclined deflecting elements in the form of vanes 101 extend radially outwardly from a substantially vertical central axis 102 toward the planar shelf 3, to which the vanes 101 are attached. The vanes 101 partially separate the mixing zone 49 from the settling zone 50, and are arranged to provide a plurality of openings 52 permitting fluid to flow progressively from the mixing zone 49 into the settling zone 50. As in the fifth embodiment of the invention as illustrated in FIGS. 13 to 18, the vanes 101 are inclined with respect to the horizontal plane. Preferably, the angle of inclination $\theta$ is substantially between 10° and 25°, as best shown in FIG. 24. However, the vanes 101 are also each inclined so that an inner end 103 of each vane is raised relative to an outer end 104. In other words, the vanes 101 are inclined radially inward relative to the feedwell 100, preferably at an angle of radial inclination $\rho$ of substantially between 2° and 6°, as best shown in FIG. 27. The vanes 101 can also be viewed as being inclined with respect to a vertical plane parallel to the central axis 102 of the feedwell 100, in which case the angle of inclination would be between 84° and 88°.

This particular configuration of the vanes 101 ensures that the slurry is baffled by restricting the fluid flow of the slurry into the settling zone 50, thus dissipating the kinetic energy of the slurry. The configuration of the vanes 101 also temporarily retains the feed fluid in the mixing zone 49, thus ensuring that the slurry does not flow off the shelf 3 and downwardly out of the feedwell 100 without sufficiently mixing with reagents and/or dilution liquid, Thus, the dissipation of the kinetic energy of the incoming feed fluid, and mixing of the slurry with reagents, such as flocculating and/or coagulating agents, as well as mixing of the slurry with any dilution liquid in the mixing zone 49 are improved. In addition, the vanes 101 reduce the velocity of the feed slurry as it flows from the mixing zone 49 into the settling zone 50, encouraging the formation of pulp aggregates.

It will be appreciated by those skilled in the art that while the vanes 101 are inclined upwardly and radially inward, they can be arranged in the opposite configuration. That is, the vanes 101 can be arranged so that the outer ends 104 are raised relative to the inner ends 103, or inclined downwardly and radially inward. Although the vanes 101 are preferably arranged to extend radially with respect to the central vertical axis 102 of the feedwell, the vanes 101 can be disposed at an angle to a central axis of the feedwell. For example, the vanes 101 could be arranged to extend radially with respect to an axis offset or eccentric to the central axis 102 of the feedwell 100, yet still have their respective inner ends 103 raised relative to their respective outer ends 104.

In other embodiments, the deflecting elements or vanes 101 comprise several deflecting element portions that are joined at their respective ends, one or more of which have an inner end raised relative to an outer end or an outer end raised relative to an inner end. Furthermore, the deflecting element portions may alternate in upward and downward inclination to form an undulating or saw-tooth profile for the deflecting elements.

Also, the deflecting elements or vanes 101 are fixed to the shelf 3. However, the deflecting elements or vanes 101 can be attached directly to the outer sidewall forming part of the upper section 5 of the feedwell 100. Alternatively, the deflecting elements or vanes 101 can be fixed to an inner annular sidewall of the feedwell 100. Other embodiments have the deflecting elements or vanes 101 rotatably mounted to a central drive shaft coincident to the central axis 102. In this case, the deflecting elements or vanes 101 would be slowly rotated to minimise turbulence and allow the deflecting elements to perform their baffling (ie. energy dissipation) and feed slurry retention functions.

It will also be appreciated that other types of deflecting elements may be used other than planar vanes. For example the deflecting elements may be baffles or curved plates. In addition, the deflecting elements can adopt different geometrical shapes, for example, rectangular, circular, oval, triangular, pentagonal, hexagonal or other polygonal shapes, regular and irregular.

The inclined deflecting elements also provide an advantage where a feedwell has a deflection cone and a scraper assembly for cleaning the surface of the deflection cone. The scraper assembly typically comprises two or more scraper arms bearing scraper blades that engage the surface of the deflection cone, associated support arms connecting the scraper arms to the central drive shaft and a lifting mechanism to vertically adjust the position of the scraper arms so as to engage and disengage the scraper blades from the deflection cone surface. In this case, a suitable clearance is required between the deflection cone and the shelf and/or deflecting elements (where present) to permit the operation and vertical adjustment of the scraper assembly. By providing inclined deflecting elements, feedwell advantageously increases the clearance between the deflecting elements and the deflection cone for the scraper assembly, without having to increase the depth or height of the feedwell chamber to accommodate the scraper assembly.

In addition, dilution ports 106 are circumferentially arranged around the upper section 5 to feed clarified liquid into the mixing zone 49 for diluting the feed slurry autogenously. This dilution mechanism can be used to optimise the feed slurry concentration so as to improve the rate of floc formation and thereby improve separation efficiency.

Figure 25:
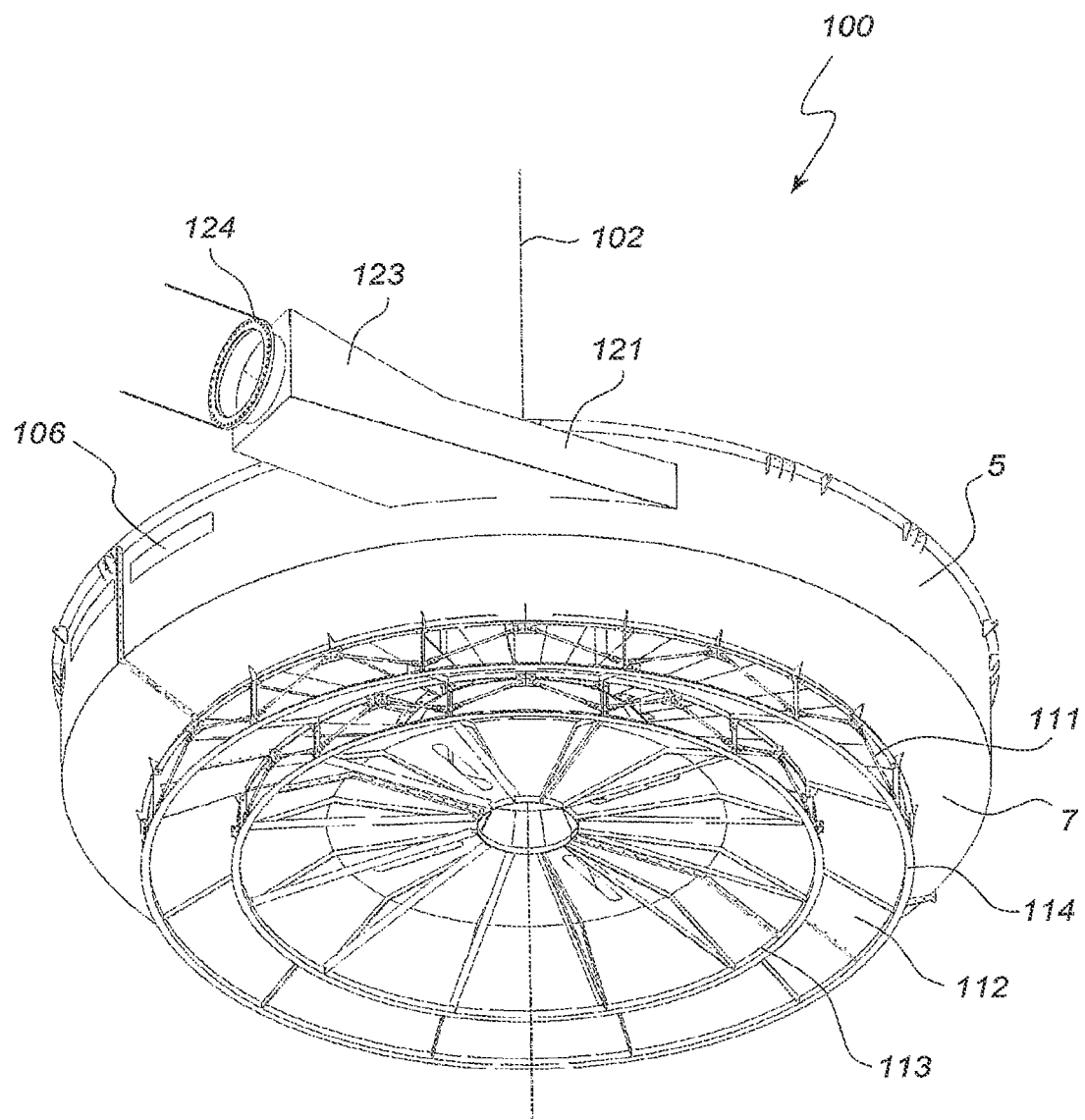
FIG. 25 is an underside perspective view of the feedwell of FIG. 22.
Figure 26:
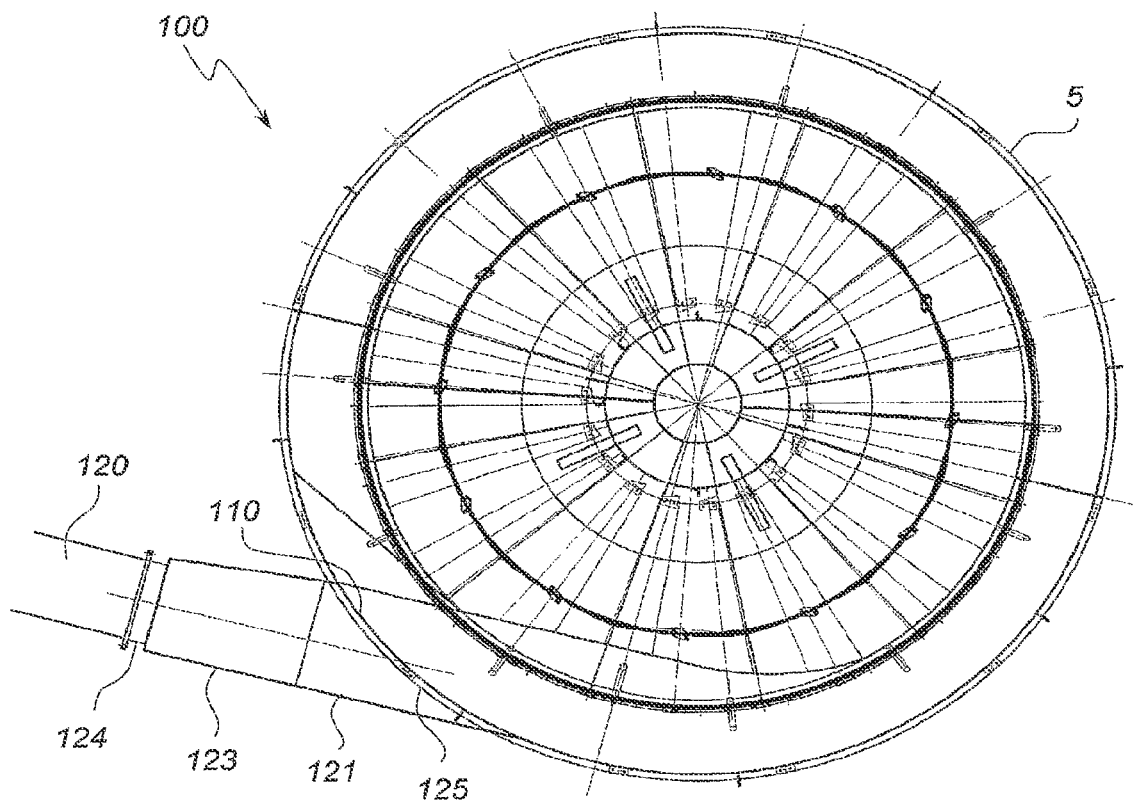
FIG. 26 is a top view of the feedwell of FIG. 22.
Figure 28:
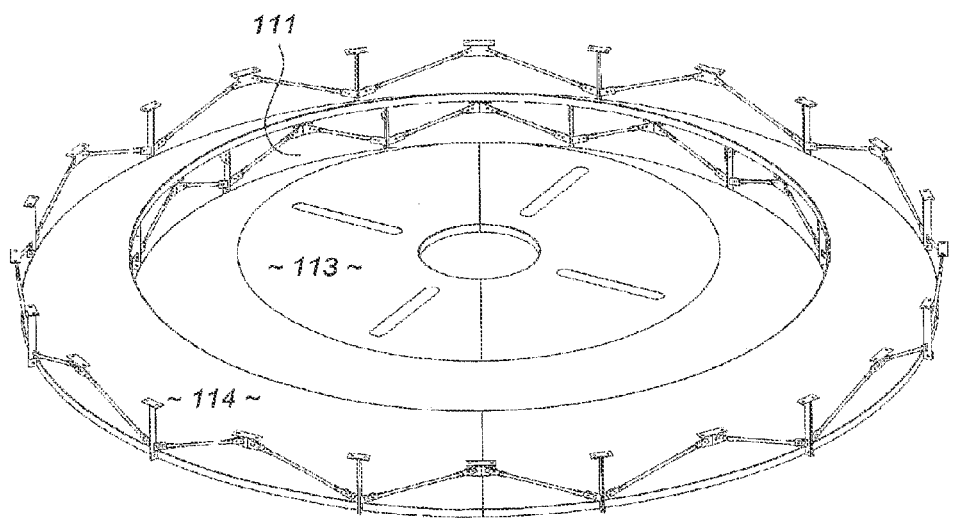
FIG. 28 is a partial cut-away view illustrating the dual outlets of the feedwell of FIG. 22.

The feedwell 100 also comprises an inlet 110 for receiving feed liquid or pulp and two outlets 111 and 112 for discharging the treated feed liquid into the separation device, wherein the outlets are arranged in a substantially concentric relationship to each other. In this embodiment, the feedwell 100 has two deflection surfaces, being an inner deflection surface 113 and an outer deflection surface 114, at least partially defining the inner outlet 111 and the outer outlet 112, respectively, as best shown in FIGS. 27 and 28. The inner deflection surface 113 and the outer deflection surface 114 restrict the flow of fluid from the settling zone 50 to the outlets 111 and 112 so that the inner outlet 111 and the outer outlet 112 also restrict the flow of treated fluid or slurry out of the feedwell 100 and into the tank. The inner and outer deflection surfaces 113 and 114 are frusto-conical in shape to at least partially define a corresponding inner conduit 115 and outer conduit 116 (both conduits or passages being generally annular in cross-sectional profile) for guiding fluid towards the outlets 111 and 112, respectively. As best shown in FIGS. 25 and 27, the deflection surfaces 113 and 114 are generally complementary in shape so that they can be disposed in a nested relationship, thus minimising their respective heights or depths h as well as the overall height or depth of both surfaces. Since the outlets 111 and 112 are arranged substantially concentrically with respect to each other, the outlets are substantially annular in shape, thus enabling a relatively uniform distribution of fluid to be discharged into the separation device.

The configuration of the dual outlets 111 and 112 is particularly advantageous where the feedwell is increased in size. Due to the deflection surfaces 113 and 114 having a smaller vertical depth, compared with a single deflection surface of comparable area, the extent to which they intrude into the tank is minimised which avoids the risk of interfering with the rake assembly, especially its lifting mechanism.

Figure 22:
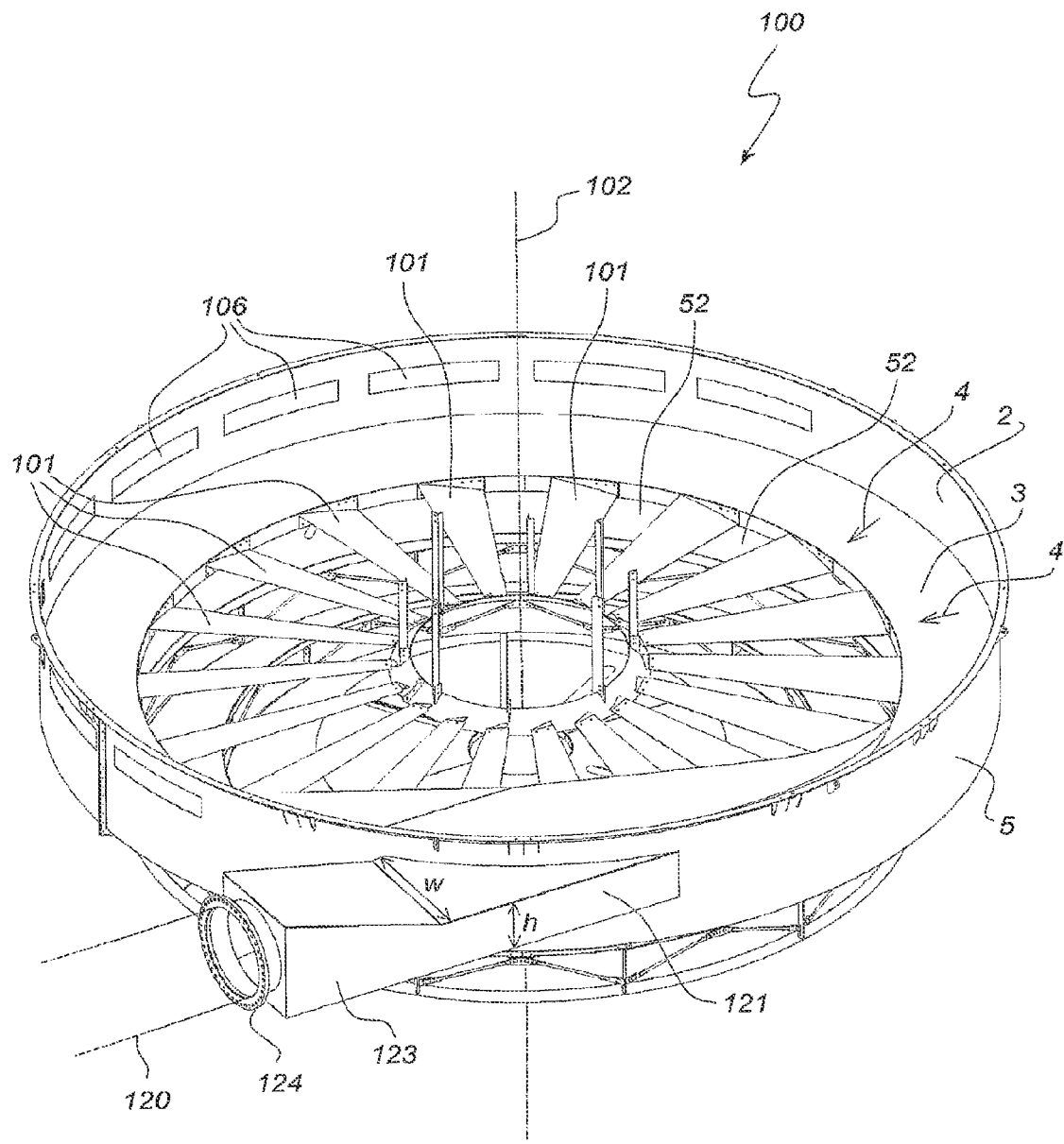
FIG. 22 is a perspective view of a feedwell according to a seventh embodiment of the invention.
Figure 23:
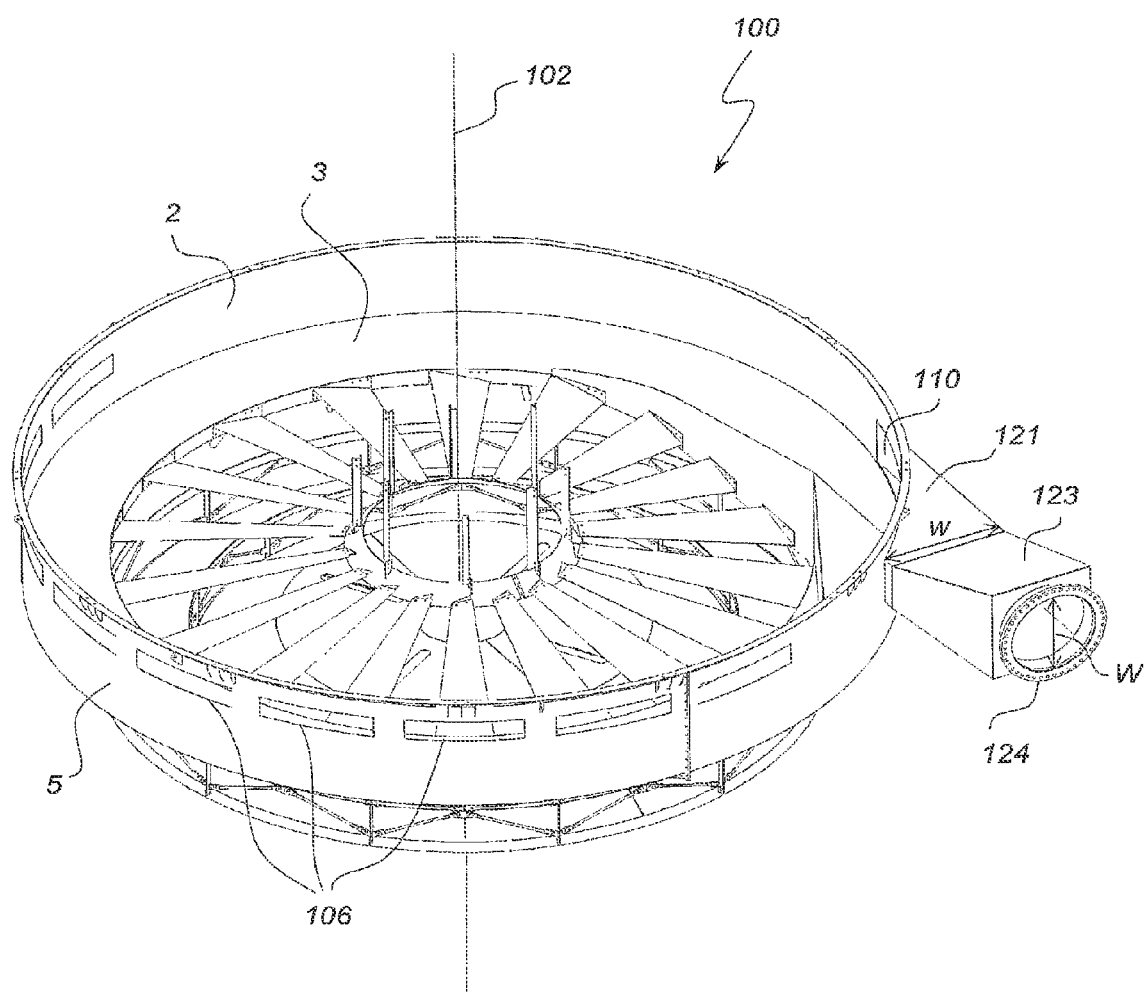
FIG. 23 is another perspective view of the feedwell of FIG. 22.

The seventh embodiment also incorporates another aspect of the invention, where the feedwell 100 has a feed inlet 110 to receive the fluid from a first conduit in the form of a feed pipe 120 and a second conduit in the form of a transition box 121 for interconnecting the feed pipe and the feed inlet. The cross-sectional size and shape of the feed pipe 120 is different to the cross-sectional size and shape of the feed inlet 110. In particular, the transition box 121 has an effective height h that is less than the height H of the feed pipe 120, while having an effective width w that is greater than the width W of the feed pipe, as best shown in FIGS. 22, 23 and 27. The feed inlet 110 has the substantially same height h as the effective height it and as the transition box 121, While having a width substantially the same as or greater than the width w of the transition box. The transition box 121 therefore comprises a portion 123 that varies in its cross-sectional size and shape to fluidly connect the feed inlet 110 and the feed pipe 120. It will be appreciated by one skilled in the art that the feed inlet 110 and the feed pipe 120 may only be different in either size or shape, and need not be different in both. Similarly, the transition box 121 and/or portion 123 may also vary only in either size or shape, although they may of course vary in both parameters.

This configuration of the transition box 121 enables the feed inlet 110 to feed the fluid into an upper portion or section 5 of the feedwell 100, irrespective of the size and/or shape of the feed pipe 120. The feed inlet 110 preferably feeds fluid into the upper 75% of the feedwell, more preferably the upper 50% of the feedwell and even more preferably the upper 30% of the feedwell, Due to the reduction in height from the feed pipe 120 to the feed inlet 110 via the transition box 121, the level of the feed pipe 120 can be raised relative to the feedwell 100, thus effectively raising the lowermost point of entry of the feed fluid or slurry into the feedwell. That is, the transition box 121 enables the effective height of the feed inlet to be reduced, meaning the feed pipe 120 can be moved further up relative to the feedwell 100. As a consequence, the lowermost point of entry of the feed slurry is elevated above the settling zone 50, so that all of the feed fluid enters the mixing zone 49 before flowing into the settling zone. In other words, raising the lowermost point of entry for the feed slurry permits a better design of the feedwell overall and the geometry (size and shape) of the mixing and settling zones. This is because the design of the mixing and settling zones is not restricted by the size and shape of the main feed inlet pipe 120 or the location of the inlet pipe at the sidewall of the feedwell 100. Thus, the substantially entire volume of the feed slurry optimally passes through the mixing zone 49 with sufficient residence time, thus optimising the subsequent formation of flocs in the settling zone 50 and separation efficiency.

The reduction in the height h of the feed inlet 110 is compensated by increasing its width w. Thus, the entry velocity of the feed shiny into the feedwell 100 is maintained from the feed pipe 120 to the feed inlet 110.

The transition box 121 has an inlet 124 that conforms to the cross-sectional size and shape of the feed pipe 120. Similarly, the transition box 121 has an outlet 125 that has the same cross-sectional size and shape as the cross-sectional size and shape of the feed inlet 110 formed in the sidewall of the feedwell. The transition box 121 thus provides a substantially continuous transition along section 123 from the cross-sectional shape of the feed inlet 110 and the transition box outlet 125 to the transition box inlet 124 and feed pipe 120.

While the transition box 121 has a substantially circular cross-section at its inlet 124 to correspond with the circular cross-section of the feed pipe 120, there is a stepwise change in the cross-section of the transition box 121 to a generally rectangular cross-section at portion 123 to enable a smoother transition to the cross-sectional size and shape of the feed inlet 110 downstream. However, it will be appreciated that the transition box 121 can be configured to adopt a more circular cross-section at the junction of the transition box inlet 124 and the portion 123 to provide a smoother and more continuous transition along its entire length from its inlet 124 to its outlet 125.

Although the cross-sectional sizes and/or shapes of the first conduit 120 and the feed inlet 110 are different, they are configured so that their respective cross-sectional areas are substantially equal or the same. This permits the velocity of the fluid entering the feedwell 100 from the feed inlet 110 to be substantially the same as the velocity of the fluid entering the transition box 121 from the feed pipe 120. This effectively ensures that the incoming feed fluid maintains its entry velocity from the feed pipe 120 through the transition box 121 and the feed inlet 110, into the upper portion of the feedwell corresponding to the mixing zone 49. Thus, an increased volume of feed slurry can be processed (by increasing the size of the feed pipe 120) without interfering with the operation of the feedwell 100.

It will be noted that in this embodiment, the transition box 121 and its varying portion 123 is configured so that the ceiling or obvert 126 of the feed pipe 120 is higher than the ceiling or obvert 127 of the feed inlet 110, as best shown in FIG. 27, In an alternative embodiment, the second conduit or transition box 121 and its varying portion is oppositely configured, so that the floor or invert 128 of the feed pipe 120 is lower than the floor or invert 129 of the feed inlet 110.

In other embodiments, the feed pipe 120 is replaced with a feed trough, channel or conduit of any other shape.

In operation, the feed pipe 120 delivers a feed slurry to the feed inlet 110 of the feedwell 100 via the transition box 121. As the portion 123 of the transition box 121 varies in its cross-sectional size and shape, the feed inlet 110 is able to tangentially feed the slurry into the upper section or portion 5 (ideally the upper half) of the feedwell 100, regardless of the size and shape of the feed pipe 120. This enables the feedwell 100 to process large volumetric flows of feed slurry relative to the effective height of the feed inlet. The feed slurry then flows tangentially into the mixing zone 49, where its kinetic energy gradually dissipates as it flows along the shelf 3 and around the mixing zone. Any build up of solid material on the shelf 3 flows along the inclined path 4 towards the inclined vanes 101. The radially inward inclination of the vanes 101 prevents the slurry flowing downwardly from the shelf 3 out of the feedwell by retaining the feed slurry in the mixing zone 49 for a sufficient residence time, thus improving the dissipation of kinetic energy and optimising mixing of the slurry with reagents and/or dilution liquid introduced through the dilution ports 106. After a suitable residence time in the mixing zone 49, the treated slurry then flows through the openings 52 into the settling zone 50, which promotes flocculation of the slurry. The treated slurry is then guided by the deflection surfaces 113 and 114 through the inner and outer conduits 115 and 116 for discharge from the outlets 111 and 112, respectively. As discussed above, the substantially concentric configuration of the outlets 111 and 112 enables the deflection surfaces 113 and 114 to minimise their overall depth in the tank, thus enabling a larger capacity for the feedwell 100 without interfering with other components of the separation device or thickener, such as the rake assembly, and maintaining the optimal outlet flow area for the desired exit velocity of the fluid into the separation device.

Figure 29:
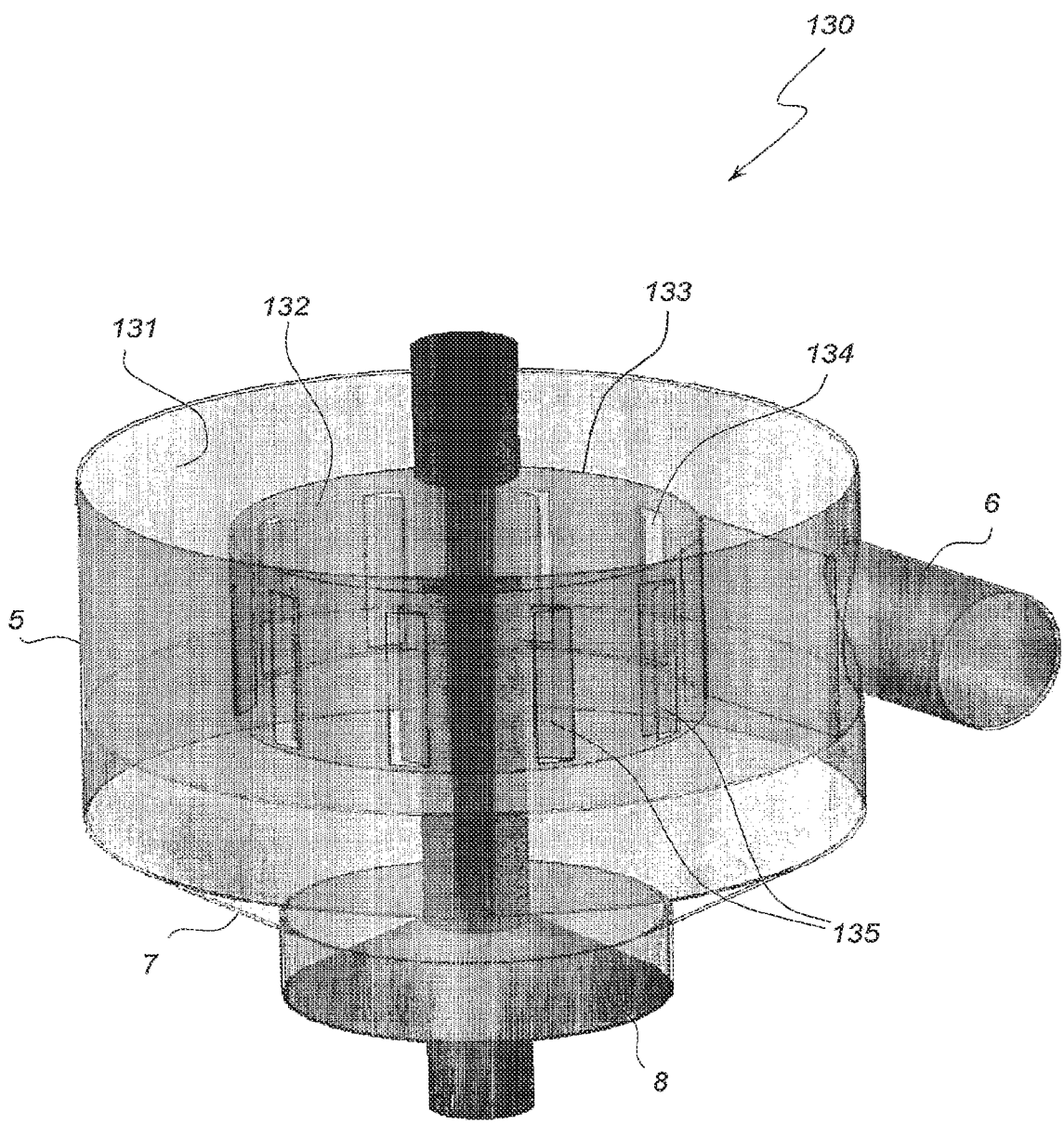
FIG. 29 is a perspective view of a feedwell according to an eighth embodiment of the present invention.
Figure 30A:
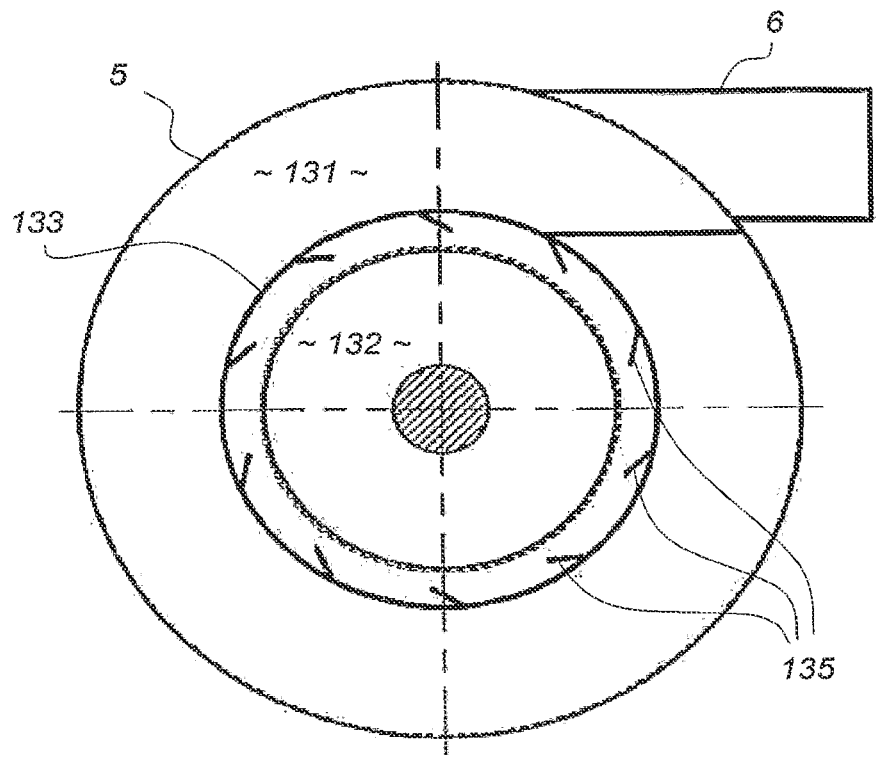
FIG. 30a is a plan view of the feedwell of FIG. 29.
Figure 30B:
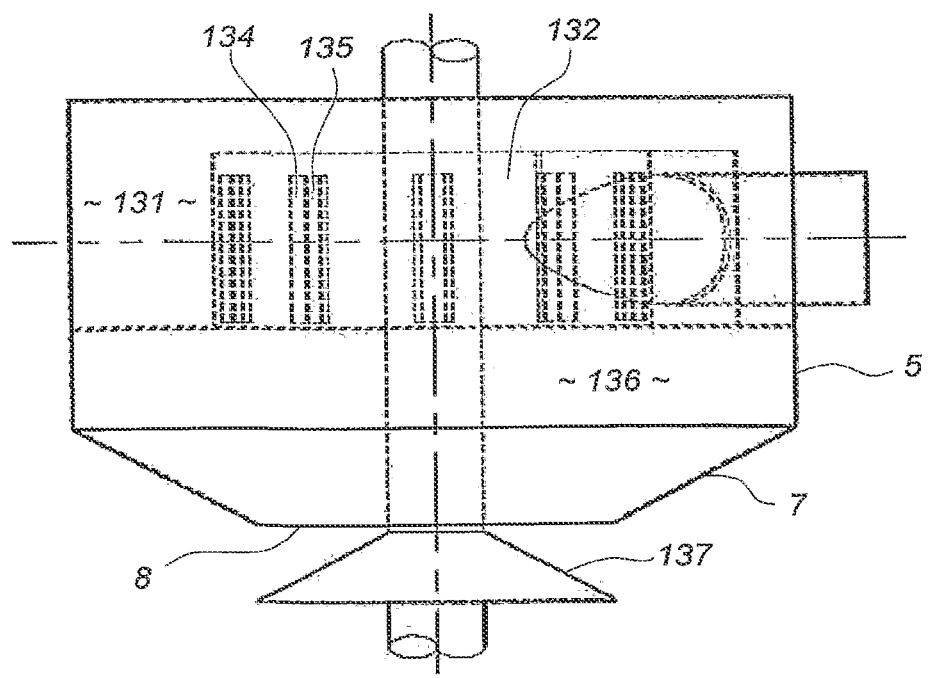
FIG. 30b is a cross-sectional view of the feedwell of FIG. 29.

Referring to FIGS. 29, 30a and 30b, an eighth embodiment of the invention is illustrated, where corresponding features have been given the same reference numerals. In this embodiment of the invention, the feedwell 130 comprises an outer mixing zone 131 for dissipating the kinetic energy of the feed liquid or pulp, an inner settling zone 132 for promoting flocculation of the pulp and a cylindrical partition 133 for separating the outer mixing zone and the inner settling zone. A plurality of openings 134 are arranged circumferentially around the partition 133 to enable fluid to flow from the outer mixing zone 131 into the inner settling zone 132. Each of the openings 134 has an associated guiding element in the form of a plate 135 for guiding the fluid into the inner settling zone 132 after it passes through the opening from the outer mixing zone 131. The plates 135 are located adjacent or at the respective edges of the openings 134, and extend into the inner settling zone 132.

A feed inlet 6 tangentially delivers the fluid into the mixing zone 131, where the kinetic energy of the fluid dissipates and encourages mixing of the feed fluid with reagents, such as flocculating and/or coagulating agents. Feed fluid then passes through the openings 134 formed in the partition 133 and enters the settling zone 132, where it is guided by the plates 135. The fluid then flows downwardly from the inner settling zone 132 into a lower settling area 136, from where it flows through a restricted outlet 8 into the separation device. A deflection cone 137 enables uniform distribution of the feed fluid into the tank of the separation device.

Unlike the other embodiments of the invention, the outer mixing zone 131 and the inner settling zone 132 are arranged in a substantially concentric side-by-side relationship to each other due to the vertically oriented cylindrical partition 133. Moreover, the outer mixing zone 131 is formed in the outer annular area of the feedwell 130, whereas the inner settling zone 132 is formed within the inner cylindrical area of the feedwell. Thus, the feedwell 130 has three zones; the outer mixing zone 131, the inner settling zone 132 and the lower settling area 136.

Figure 31A:
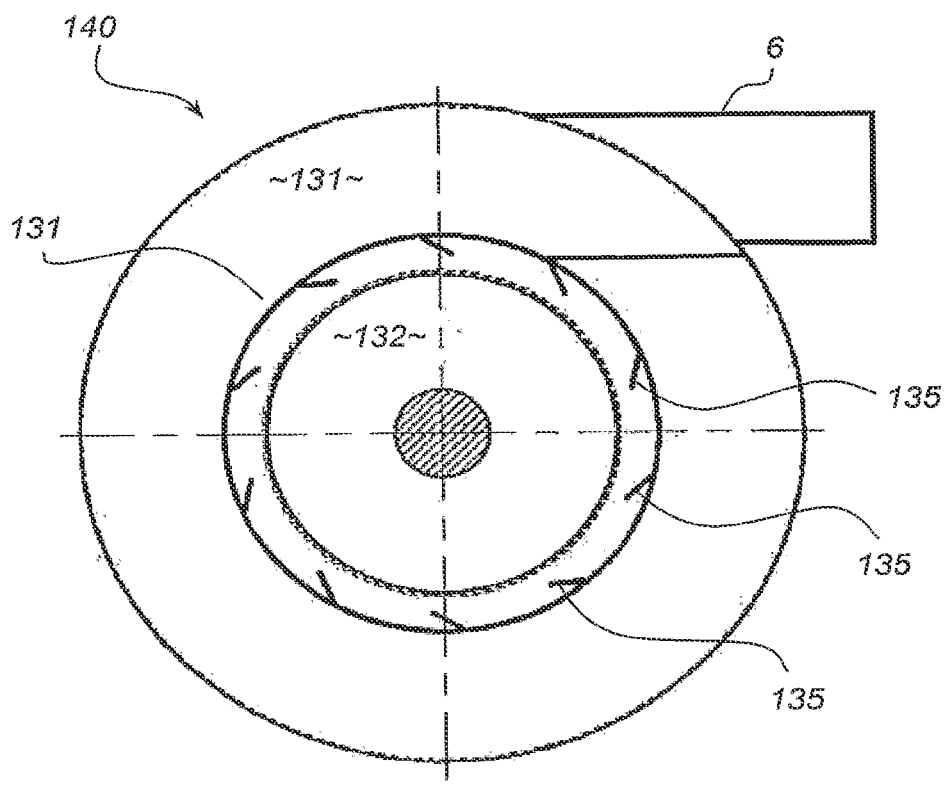
FIG. 31a is a plan view of a feedwell according to a ninth embodiment of the invention.
Figure 31B:
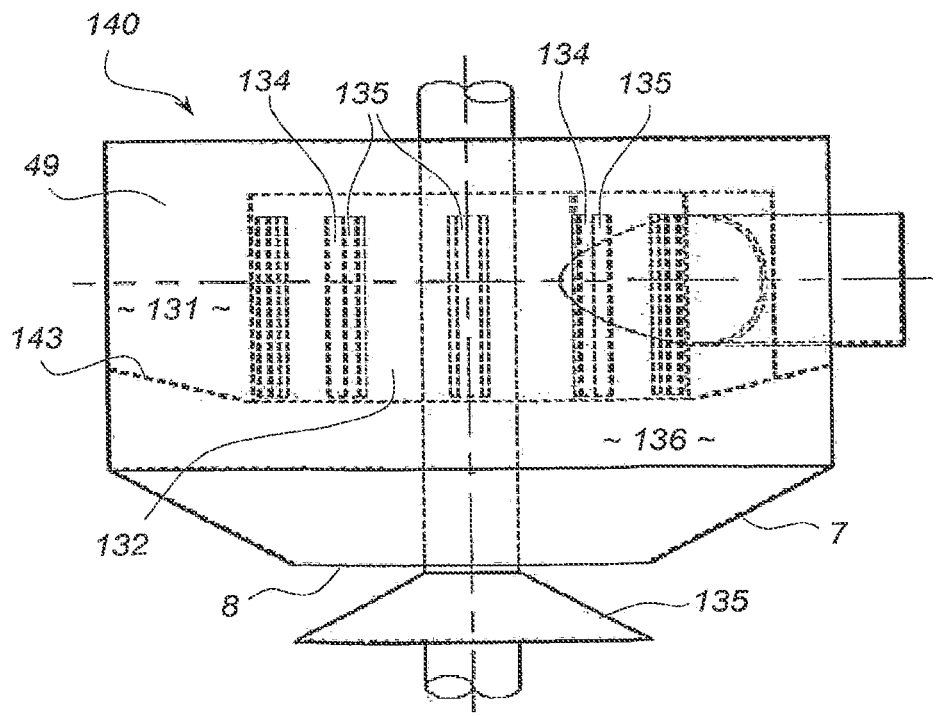

An alternative ninth embodiment is illustrated in FIGS. 31*a* and 31*b*, where again corresponding features have been given the same reference numerals. In this embodiment, the feedwell 140 has a substantially annular shelf 143 that is inclined radially inward with respect to the feedwell.

Figure 32A:
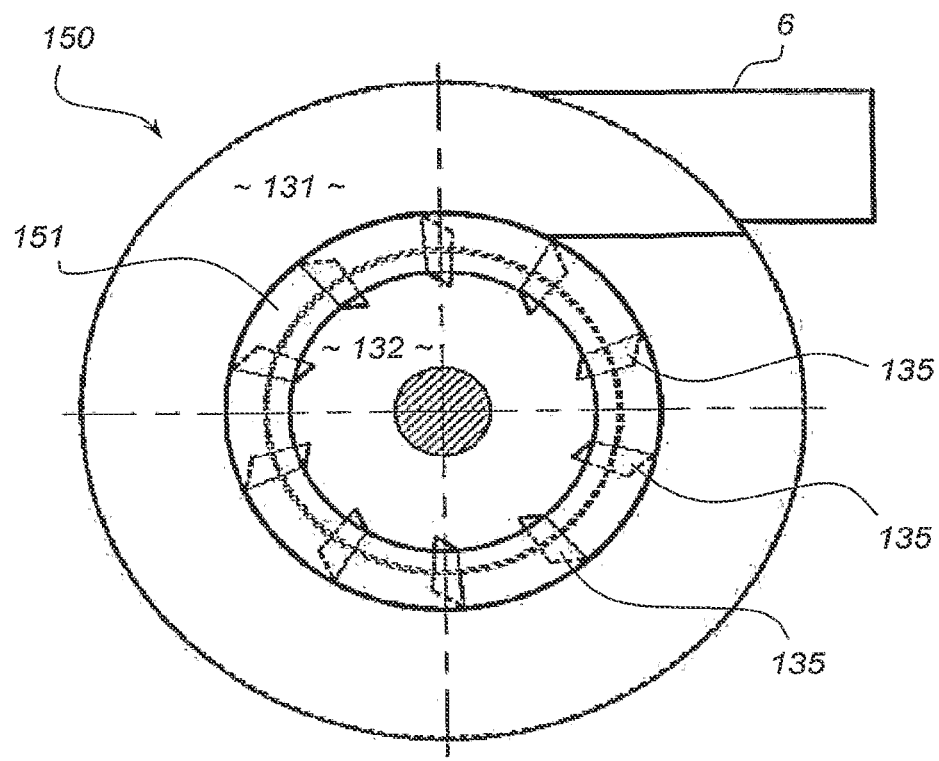
FIG. 32a is a plan view of a feedwell according to a tenth embodiment of the invention.
Figure 32B:
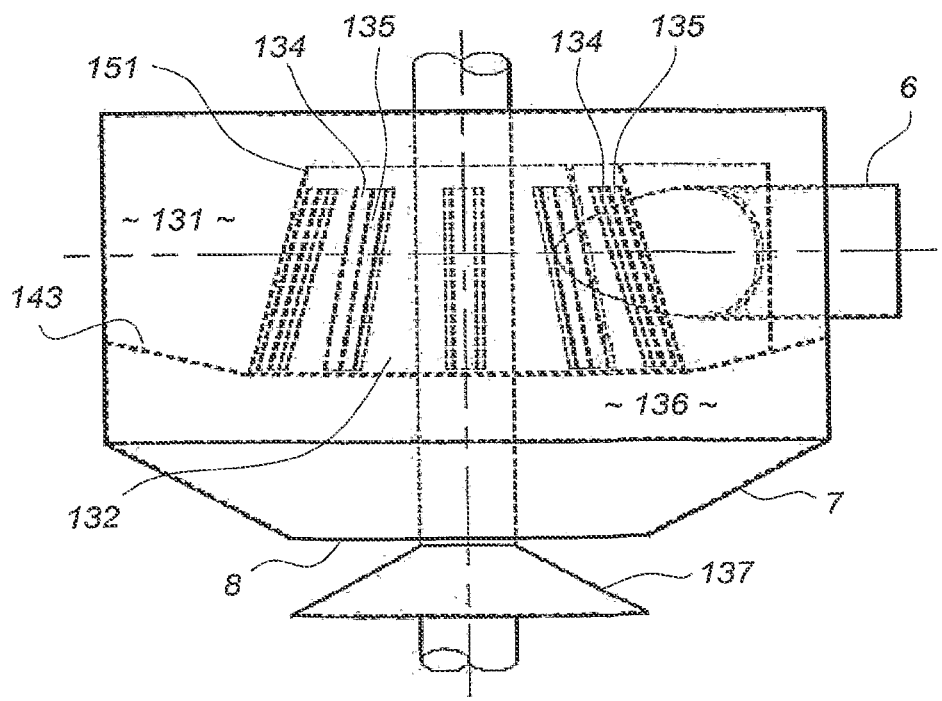

A tenth embodiment of the invention is illustrated in FIGS. 32*a* and 32*b*, where corresponding features have been given the same reference numerals. In this embodiment, the feedwell 150 has a partition 151 in the form of an inverted frusto-conical section in combination with the inclined annular shelf 143.

Figure 33A:
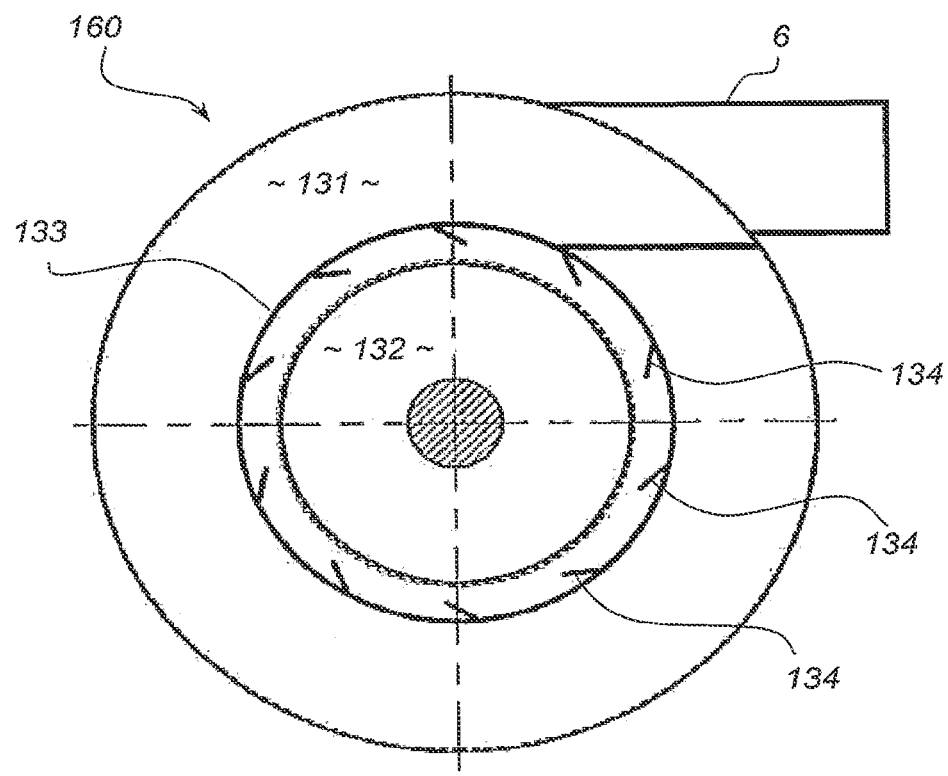
FIG. 33a is a plan view of a feedwell according to an eleventh embodiment of the invention.
Figure 33B:
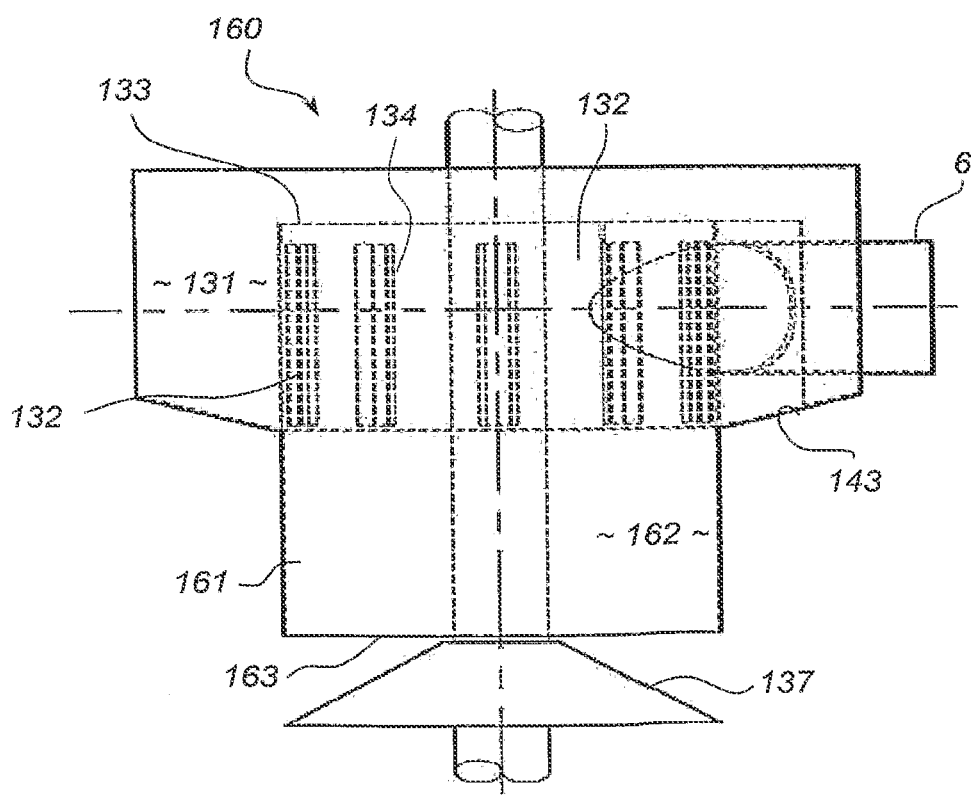

An eleventh embodiment of the invention is illustrated in FIGS. 33*a* and 33*b*, where corresponding features have been given the same reference numerals. In this embodiment, the feedwell 160 has an extended cylindrical portion 161, instead of a frusto-conical lower section 7 as in the other embodiments. This results in the outlet 161 permitting fluid to flow directly from the inner settling zone 132 into the lower settling area in the form of a lower extension zone 162 and then through the open bottom 163. A deflection cone 137 is also provided to restrict fluid flow and permit even distribution of the treated feed fluid into the separation device.

It is believed that the provision of the openings 134 and the guide plates 135 in the partition 133 reduces the effect of "sanding" in the feedwell 130, 140, 150, and 160, whereby agglomerated particles tend to accumulate at the base of the chamber of the feedwell or shelf 143. This sanding phenomenon tends to occur in the upstream chamber of two vertically divided chambers within a feedwell. Thus, this aspect of the invention improves the performance of these type of feedwells, since the openings 134 and the plates 135 allows the material to be released from the upstream chamber before it can build up and hinder operation of the feedwell. In essence, the openings 134 and the guide plates 135 perform a self-cleaning function for the upstream chamber or mixing zone.

In the embodiments illustrated in FIGS. 29 to 33*b* have fixed guide plates 135 attached to the partition 133. However, in other embodiments, the guide plates 135 are hingedly connected to the partition 133 so as to adjust the rate at which material is released from the outer mixing zone 131 into the inner settling zone 132.

In other embodiments, the shelf extends partly around the circumference of the sidewall. For example, the shelf could extend around ¼, ½ or ¾ the circumference of the sidewall. However, the shelf could extend around the circumference of the sidewall by any distance. Further some embodiments employ a plurality of shelves having one or more of the configurations as described in respect of the above embodiments. For example, multiple shelves could be in the form of partially annular rings extending only ¼ of the circumference of the sidewall, arranged to be hi alignment or overlap. The shelves could have different configurations, such as one shelf having a stepped profile, another shelf with an inclined surface as in the fourth embodiment, and a further shelf with a circumferential inclination as in a helical shape. In addition, the shelf could partially define the feedwell chamber. For example, in one embodiment the shelf formed as part of the sidewall of the feedwell chamber. In this case, the lower section 7 is preferably substantially cylindrical to define an open bottom for the feedwell, instead of being frusta-conical and narrowing to a restricted outlet. Whilst the embodiments of the invention illustrated show shelves having a downward inclination in the radially inward direction, it will be appreciated that in other embodiments, the shelf may be inclined upwardly as it extends radially inwardly. In these embodiments, the shelf may be spaced from the sidewall to create a gap for built up solids to slide off the shelf. Alternatively, in such embodiments, one or more drainage apertures, openings, channels, ports or slots may be provided to remove built up solids from the shelf.

In other embodiments of the invention, the inclined deflecting elements or vanes 101 may have their radial outer ends 104 raised relative to the inner ends 103. Another embodiment of the invention has the concentric dual outlets 111 and 112 radially spaced apart to vary the distribution of the treated feed slurry into the tank. A further embodiment of the invention has a transition box 121 that varies in its cross-sectional size and/or shape along its entire length to provide a relatively seamless and continuous transition in the cross-sectional size and shape of the feed pipe 120 to the cross-sectional size and shape of the feed inlet 110.

It will be appreciated by one skilled in the art that the various aspects of the invention improve the design and performance of separation devices employing a feedwell, especially thickeners. In the first aspect, the shelf at least partially defines an inclined path for removing or releasing solids from the shelf, thus inhibiting or preventing solids building up on the shelf. In other words, this aspect the invention provides a technical advance over the known prior art by configuring a feedwell having one or more shelves defining an inclined path for inhibiting the build up of solids on the shelf or shelves. In addition, the illustrated feedwells according to the preferred embodiments of the invention inhibit or prevent the build up of solids upon the shelf without adversely affecting retention of material in the feedwell and mixing with flocculating agents. The feedwells also permit the use of larger shelf widths, thus enhancing its mixing and flocculation characteristics. Moreover, the reduction or substantial elimination of accumulated solids on the shelf minimises the frequency and amount of maintenance and cleaning of feedwell shelves. This in turn results in improved production efficiency in separation devices incorporating such feedwells.

In the second aspect, the provision of radially inclined deflecting elements ensures that the feed fluid is kept within the mixing zone for a sufficient time to enable dissipation of its kinetic energy, optimal mixing with reagents and dilution with clarified liquid from the tank. The deflecting elements also reduce the velocity of the feed fluid from the mixing zone to the settling zone to encourage the formation of pulp aggregates. Thus, this results in an improved settling efficiency in separation devices incorporating feedwells having this aspect. Where the feedwell employs a deflection cone and scraper assembly, the radially inclined deflecting elements also advantageously provide a suitable clearance between itself and the deflection cone to accommodate the installation and operation of the scraper assembly without increasing the overall height or depth of the feedwell chamber.

The third and fourth aspects also improve the design of feedwells, thus enabling a separation device to be increased in size to accommodate larger volumetric flows of feed slurry without detrimentally affecting the overall operation of the separation device. In the third aspect, the substantially concentric arrangement of the dual outlets ensures that their associated deflection surfaces have a relatively smaller overall vertical depth, minimising the risk of interfering with other components of the separation device, such as the rake assembly, whilst maintaining the optimal cross-sectional flow area of the outlet for the desired exit velocity of the fluid passing into the separation device. In the fourth aspect, the provision of an intermediate conduit fluidly connecting the feed pipe to the feed inlet that varies in its cross-sectional size and/or shape enables the feed inlet to be optimally designed to deliver the feed fluid into the upper portion or zone of the feedwell, regardless of the cross-sectional size and/or shape of the feed pipe, trough, channel or other feed conduit. This enables the feedwell to process large volumetric flows of feed fluid that consequently arise from increasing the size of the separation device, without adversely affecting the design and operation of the feedwell.

Finally, the fifth aspect of the invention addresses the potential effect of sanding in the feedwell, where agglomerated particles tend to accumulate at the base of the mixing zone (for example, in a dual chamber feedwell) by providing a partition partially separating the mixing zone and the settling zone, thus allowing material to be released into the settling zone before it builds up in the mixing zone.

In all these respects, the various aspects of the invention represent practical and commercially significant improvements over the prior art.

Although the invention has been described with reference to specific examples, it will be appreciated by those skilled in the art that the invention may be embodied in many other forms. For example, a feedwell may incorporate one or more of the various aspects of the invention in combination.

The invention claimed is:

1. A feedwell for a separation device, said separation device having a tank, said feedwell comprising:
    a sidewall at least partially defining a feedwell chamber;
    a feed inlet for directing a feed fluid into said feedwell chamber;
    an outlet disposed below the feed inlet for discharging said feed fluid from said feedwell chamber into said tank,
    a shelf at least partially defining an inclined path for removing material from said shelf into said feedwell chamber and inhibiting the build-up of material thereon, and
    a plurality of deflecting elements for restricting fluid flow in said feedwell chamber, wherein each said deflecting element is connected at one end to said shelf;
    wherein said feed inlet is disposed such that said feed fluid flows from said feed inlet onto said shelf.

2. The feedwell of claim 1, wherein said feed inlet is located adjacent, at or towards an upper surface of said shelf.

3. The feedwell of claim 1, wherein said inclined path is inclined in the longitudinal direction of said shelf.

4. The feedwell of claim 1, wherein said inclined path is circumferentially inclined with respect to said sidewall.

5. The feedwell of claim 4, wherein said inclined path has an angle of inclination that is substantially between 2° and 10° relative to the horizontal plane.

6. The feedwell of claim 1, wherein said the inclined path is substantially helical in shape.

7. The feedwell of claim 1, wherein said shelf comprises an inclined surface defining said inclined path.

8. The feedwell of claim 1, further comprising a plurality of said shelves.

9. The feedwell of claim 8, wherein said shelves at least partially extend around the circumference of said sidewall.

10. The feedwell of claim 9, wherein said shelves define a substantially helical shape.

11. The feedwell of claim 1, wherein said outlet comprises a first outlet and a second outlet, wherein said first outlet and said second outlet are arranged in a substantially concentric relationship with respect to each other.

12. The feedwell of claim 1, wherein said feed fluid comprises a liquid suspension or pulp, wherein said feed inlet receives said feed fluid from a first conduit, said feedwell further comprising a second conduit for connecting said first conduit and said feed inlet in fluid communication, wherein said first conduit has a first cross-sectional size and/or shape, said feed inlet has a second cross-sectional size and/or shape different to said first cross-sectional size and/or shape, and a portion of said second conduit varies in its cross-sectional size and/or shape so as to connect said feed inlet to said first conduit.

13. The feedwell of claim 1, wherein said feed fluid comprises a liquid suspension or pulp, further comprising a mixing zone for dissipating kinetic energy of said liquid suspension or pulp therein and a settling zone for promoting flocculation, said shelf being located between said mixing zone and said settling zone.

14. The feedwell of claim 1, wherein said inclined path is inclined downwardly to release material from said shelf.

15. The feedwell of claim 1, wherein said inclined path is inclined radially inwardly.

16. The feedwell of claim 15, wherein said inclined path has an angle of inclination of substantially between 10° and 15° relative to the horizontal plane.

17. The feedwell of claim 1, wherein said deflecting elements are inclined deflecting elements.

18. The feedwell of claim 17, wherein said deflecting elements are inclined radially inward.

19. A method of inhibiting the build-up of material on a shelf in a feedwell, the feedwell comprising a sidewall at least partially defining a feedwell chamber, a feed inlet for discharging feed fluid into said feedwell chamber into a tank, said method comprising:
    a. defining an at least partially inclined path with said shelf for removal of material therefrom into said feedwell chamber,
    b. arranging a plurality of deflecting elements for restricting fluid flow in said feedwell chamber so that each said deflecting element is connected at one end to said shelf, and
    c. disposing said feed inlet such that said feed fluid flows from said feed inlet onto said shelf.

20. The method of claim 19, wherein said disposing step comprises locating said feed inlet adjacent, at or towards a top of said shelf.

21. The method of claim 19, further comprising inclining said inclined path downwardly to release built up material from said shelf.

22. The method of claim 19, further comprising inclining said inclined path radially and inwardly.

23. The method of claim 22, further comprising inclining said inclined path at an angle of inclination of substantially between 10° and 15° relative to the horizontal plane.

24. The method of claim 19, further comprising inclining said inclined path in the longitudinal direction of said shelf.

25. The method of claim 19, further comprising inclining said inclined path circumferentially with respect to the sidewall.

26. The method of claim 25, further comprising inclining said inclined path at an angle of inclination of substantially between 2° and 10° relative to the horizontal plane.

27. The method of claim 19, further comprising inclining said inclined path such that said inclined path is substantially helical in shape.

28. The method of claim 19, further comprising inclining said shelf from or adjacent to said sidewall at an angle of inclination to define said inclined path.

29. The method of claim 19, further comprising providing an inclined surface of said shelf to define said inclined path.

30. The method of claim 19, further comprising providing a plurality of said shelves.

31. The method of claim 30, further comprising locating said shelves at least partially around the circumference of said sidewall.

32. The method of claim 30, further comprising locating said shelves so as to define a substantially helical shape.

33. The method of claim 19, wherein said feed fluid comprises a liquid suspension or pulp, and further comprising dividing said feedwell into a mixing zone for dissipating the kinetic energy of said liquid suspension or pulp therein and a settling zone for promoting flocculation, and locating said shelf between said mixing zone and said settling zone.

34. The method of claim 19, further comprising providing at least two outlets for discharging the fluid into the separation device and arranging the at least two outlets in a substantially concentric relationship with respect to each other.

35. The method of claim 19, further comprising providing said feed inlet to receive said feed fluid from a first conduit and providing a second conduit for connecting said first conduit and said feed inlet in fluid communication, wherein said first conduit has a first cross-sectional size and/or shape and said feed inlet has a second cross-sectional size and/or shape different to said first cross-sectional size and/or shape, said method further comprising varying a portion of said second conduit in its cross-sectional size and/or shape to fluidly connect said feed inlet to said first conduit.

36. The method of claim 19, comprising inclining said deflecting elements.

37. The method of claim 36, comprising radially inclining said deflecting elements.

* * * * *